Oct. 6, 1936.  W. H. ROBERTSON  2,056,486
CASH REGISTER
Filed July 27, 1931  14 Sheets-Sheet 1

Inventor
William H. Robertson
By Earl Beust
His Attorney

Oct. 6, 1936.    W. H. ROBERTSON    2,056,486
CASH REGISTER
Filed July 27, 1931    14 Sheets-Sheet 2

Inventor
William H. Robertson
Earl Beust
His Attorney

Oct. 6, 1936.   W. H. ROBERTSON   2,056,486
CASH REGISTER
Filed July 27, 1931   14 Sheets-Sheet 3
FIG. 4
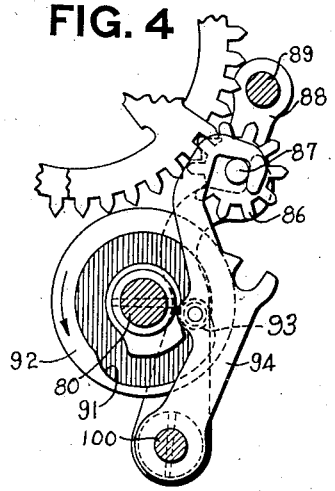
FIG. 5
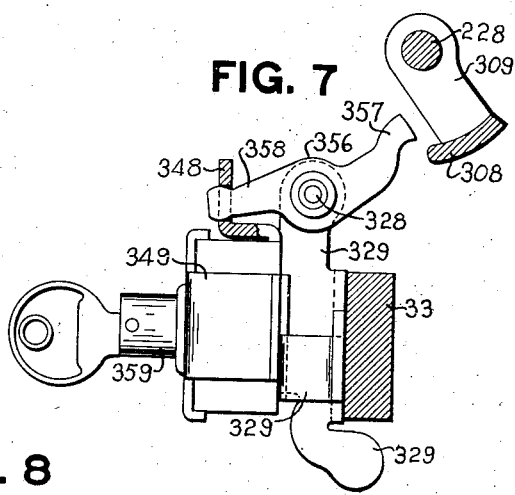
FIG. 6
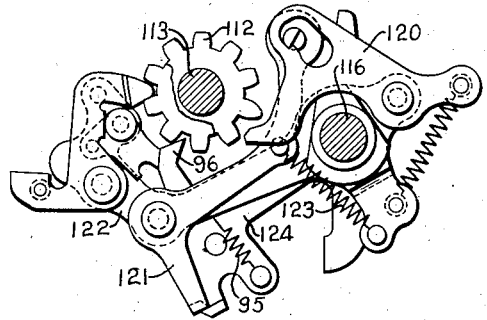
FIG. 7
FIG. 8
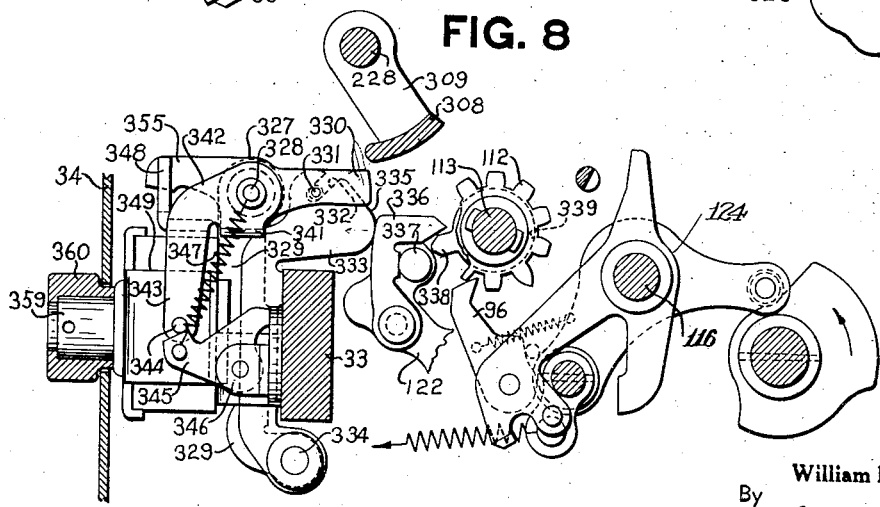
Inventor
William H. Robertson
By Earl Beust
His Attorney Oct. 6, 1936.  W. H. ROBERTSON  2,056,486
CASH REGISTER
Filed July 27, 1931  14 Sheets-Sheet 4

Inventor
William H. Robertson
By
His Attorney

Oct. 6, 1936.  W. H. ROBERTSON  2,056,486
CASH REGISTER
Filed July 27, 1931  14 Sheets-Sheet 5

Inventor
William H. Robertson
By Earl Bunst
His Attorney

Oct. 6, 1936.  W. H. ROBERTSON  2,056,486
CASH REGISTER
Filed July 27, 1931  14 Sheets-Sheet 6
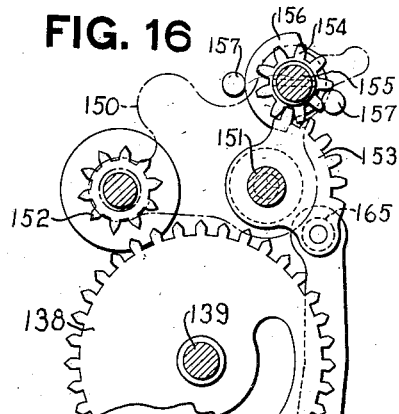
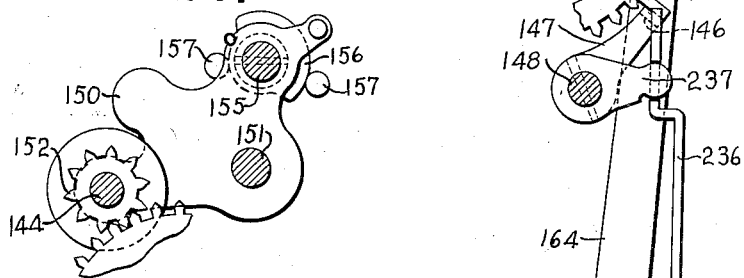
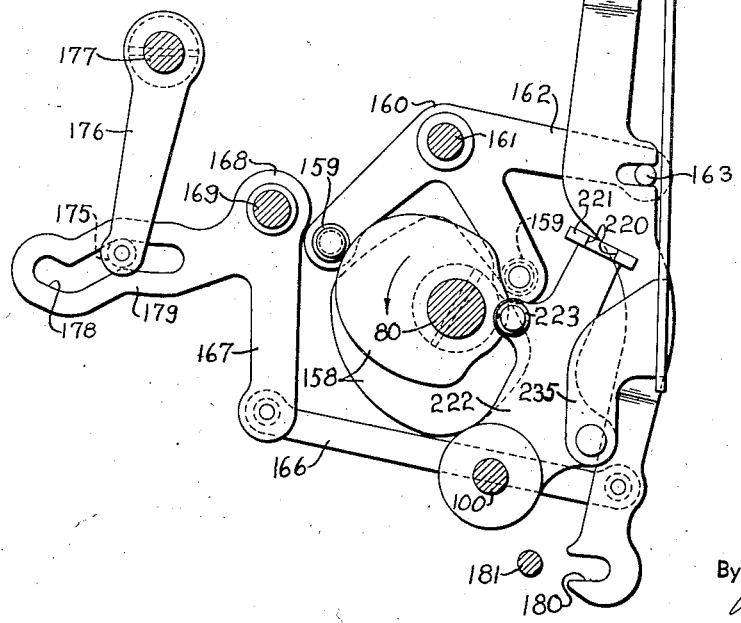
Inventor
William H. Robertson
By Hearl Beust
His Attorney Oct. 6, 1936.  W. H. ROBERTSON  2,056,486
CASH REGISTER
Filed July 27, 1931  14 Sheets-Sheet 7
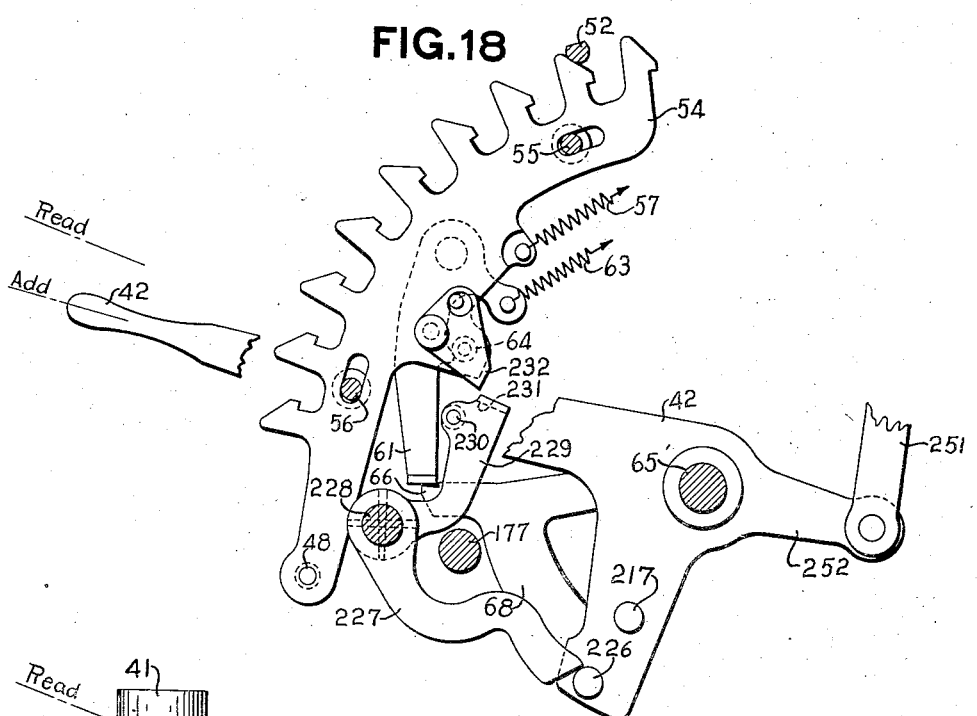
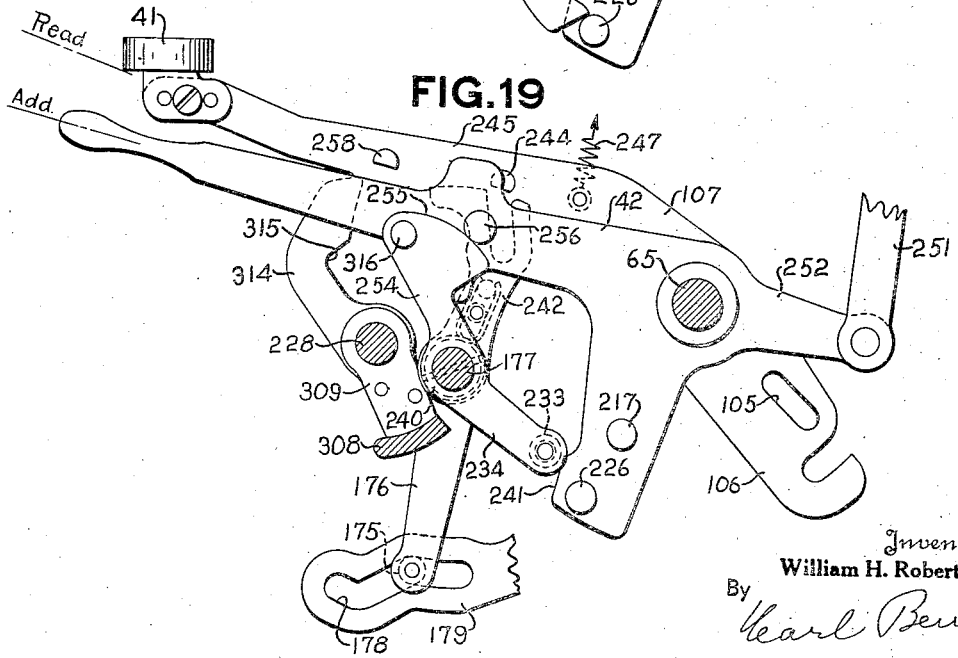
Inventor
William H. Robertson
By Earl Beust
His Attorney Oct. 6, 1936.  W. H. ROBERTSON  2,056,486
CASH REGISTER
Filed July 27, 1931  14 Sheets-Sheet 8

Inventor
William H. Robertson
By Carl Beust
His Attorney

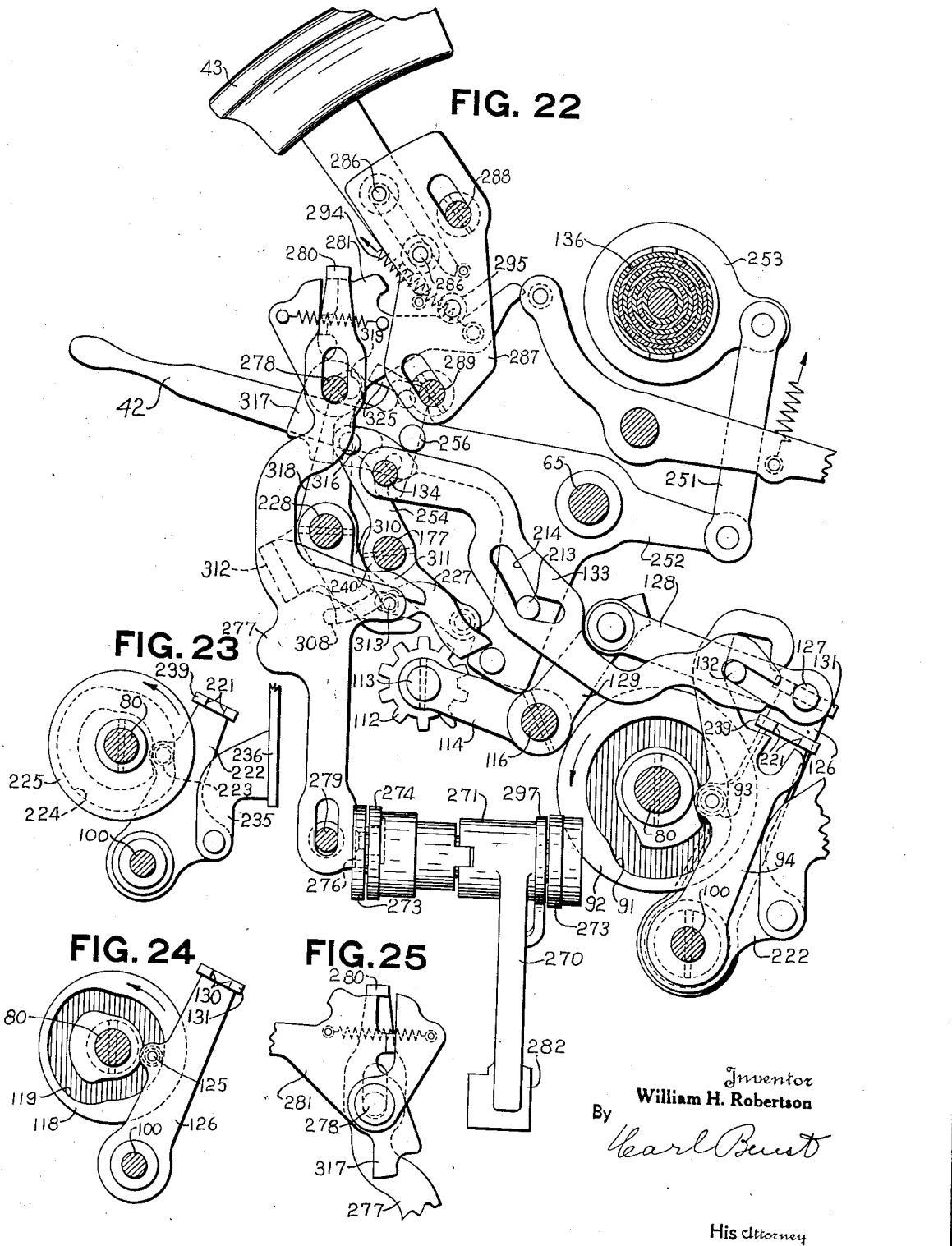

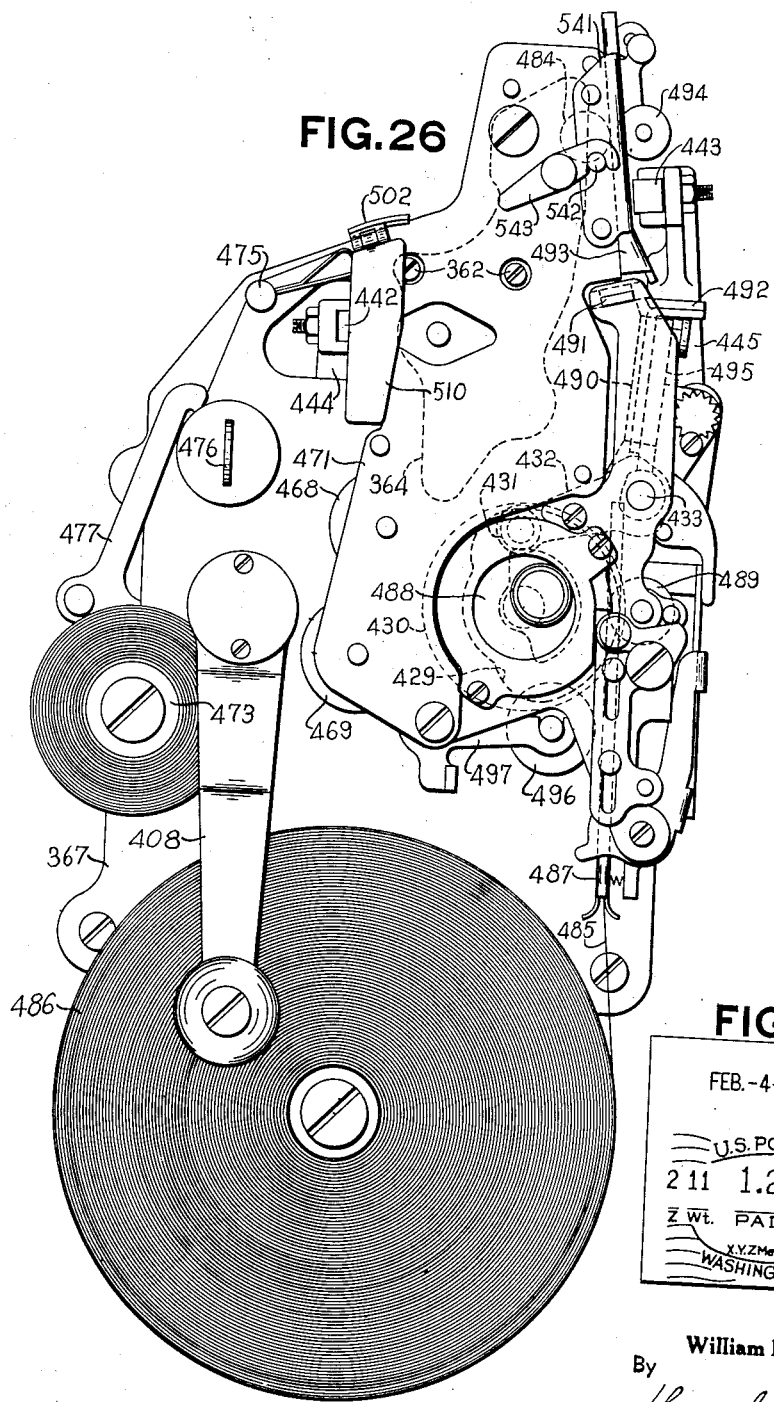

Oct. 6, 1936.  W. H. ROBERTSON  2,056,486
CASH REGISTER
Filed July 27, 1931     14 Sheets-Sheet 11

Inventor
William H. Robertson
By Carl Beust
His Attorney

Oct. 6, 1936.  W. H. ROBERTSON  2,056,486
CASH REGISTER
Filed July 27, 1931   14 Sheets-Sheet 12

Inventor
William H. Robertson
By
Carl Benst
His Attorney

Oct. 6, 1936.    W. H. ROBERTSON    2,056,486
CASH REGISTER
Filed July 27, 1931    14 Sheets-Sheet 13
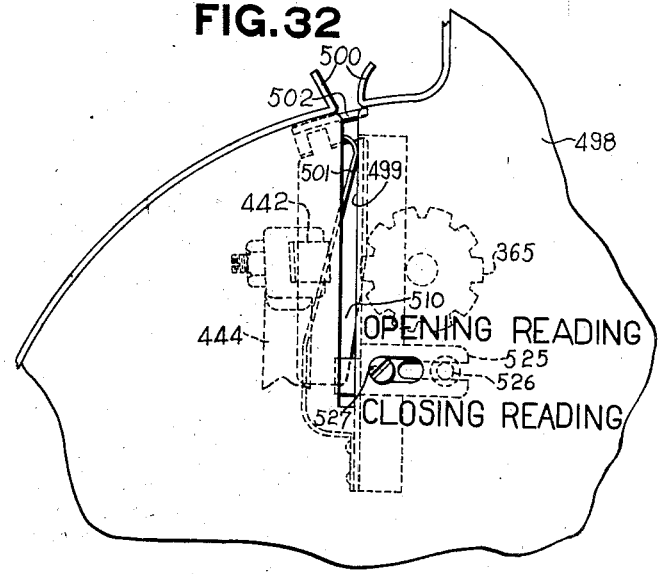
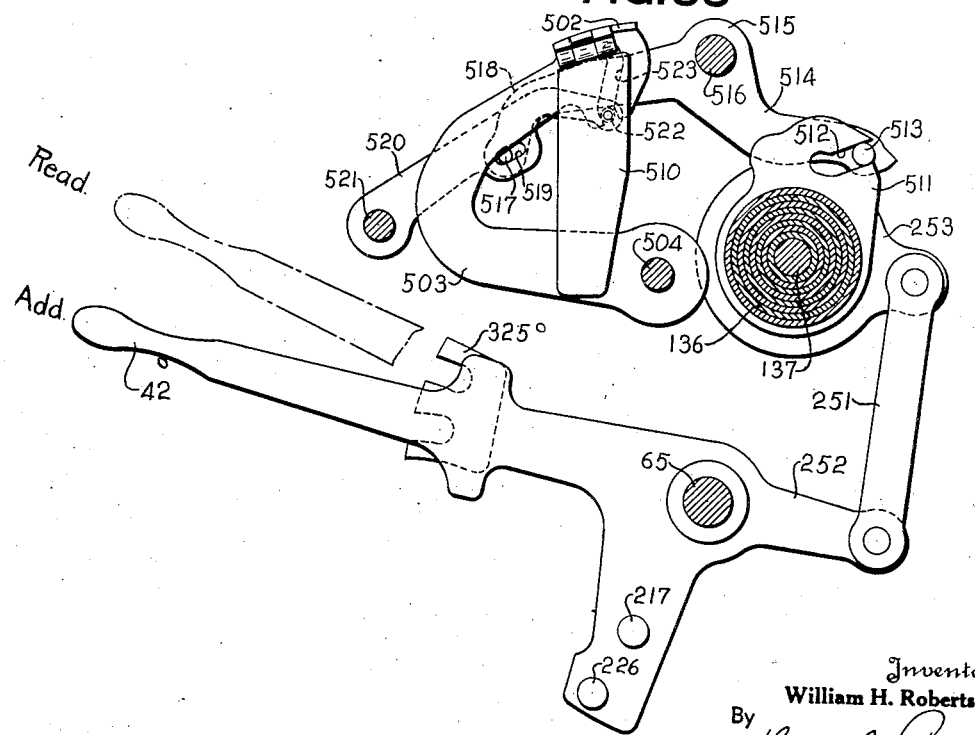
Inventor
William H. Robertson
By Carl Beust
His Attorney Oct. 6, 1936.  W. H. ROBERTSON  2,056,486
CASH REGISTER
Filed July 27, 1931  14 Sheets-Sheet 14
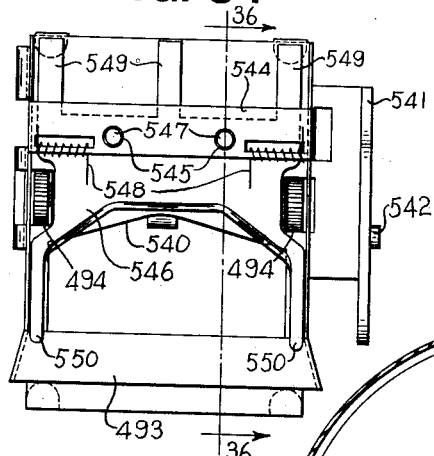
FIG. 34
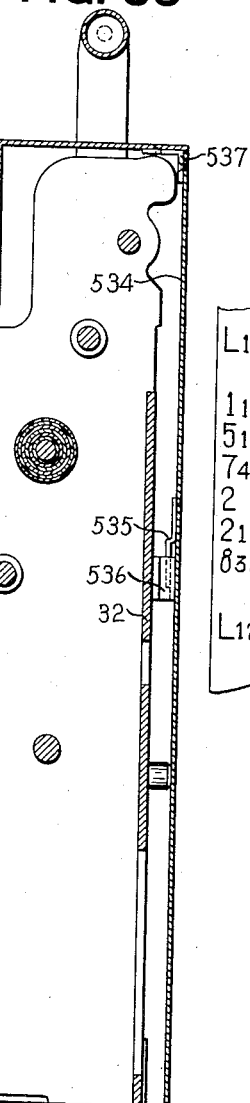
FIG. 35
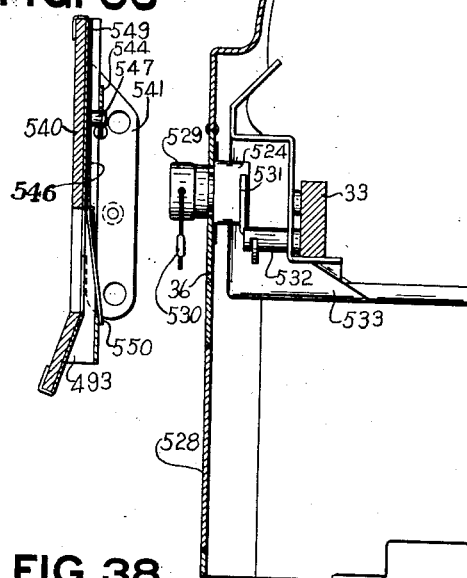
FIG. 36
FIG. 37
| L11 | 2.57 | X 670 |
|---|---|---|
| 113 | .86 | 670 |
| 514 | 1.11 | 671 |
| 740 | 3.23 | 672 |
| 2 6 | .93 | 673 |
| 211 | 1.21½ | 674 |
| 835 | 3.26½ | 675 |
| L12 | 3.18 | X 676 |
FIG. 38
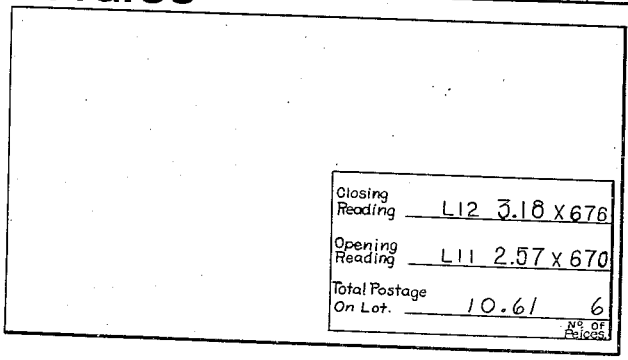
| Closing Reading | L12 3.18 X 676 | |
|---|---|---|
| Opening Reading | L11 2.57 X 670 | |
| Total Postage On Lot. | 10.61 | 6 |
| | | Nº OF Pieces. |
Inventor
William H. Robertson
By Pearl Beust
His Attorney Patented Oct. 6, 1936

2,056,486

UNITED STATES PATENT OFFICE 2,056,486

CASH REGISTER

William H. Robertson, Dayton, Ohio, assignor to The National Cash Register Company, Dayton, Ohio, a corporation of Maryland Application July 27, 1931, Serial No. 553,329

3 Claims. (Cl. 235—7)

This invention relates to registers, ticket-issuing machines, and like machines, and refers more particularly to improvements in machines of the type disclosed in Letters Patent of the United States No. 1,816,263, issued on July 18, 1931, and in application for Letters Patent of the United States, Serial No. 419,938, filed January 10, 1930, by William H. Robertson.

Machines of the type disclosed in the above mentioned patent are small, compact, and light in weight, yet are provided with a full complement of keys and other manipulative devices to control said machines to perform all of the functions usually attributed to larger and more costly machines. These functions include, generally, the accumulation of amounts on one or more totalizers, printing the amounts registered and other data on a plurality of record materials, making repeat operations, totalizing, etc. Such machines have been adapted for use in various types of commercial activities, including motor busses and other media of transportation, ticket offices, telegraph offices, department stores, etc., and are readily susceptible for use in many other lines of business.

The machine disclosed in Robertson's application, Serial No. 419,938, mentioned above, is particularly adapted for printing and recording transactions entered into the machine, and for issuing gummed postage labels, said machine printing the date, serial number or consecutive number of the label, permit or meter number, zone, weight and department in which the label is to be affixed, the amount of the postage and the postoffice and state where mailed. These data were also printed on a permanent record strip, locked in the machine, and on an issuing record strip adapted to be detached and sent to the postoffice with each lot of packages, serving as a check on the postage issued by the machine. This form of checking the postage issued is inadequate and admits of maloperation with the intent to defraud the Government.

One object of this invention, therefore, is to provide a machine (capable of issuing gummed postage labels for any class of mail) for use in postoffices, mail order businesses and other establishments wherein numerous parcels of various sizes are transmitted by mail.

Another object of this invention is to provide a machine of the type indicated with a novel means to lock the machine against operation after the total has exceeded a predetermined capacity.

Another object of this invention is to effectively lock the machine cabinet onto the machine, thereby preventing maladjustment of the totalizer or other elements by insertion of a foreign object or objects.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings

Fig. 4 is a detail view of a part of the mechanism for operating the coupling pinions.

Fig. 5 is a detail view of one of the weight and zone differentials.

Fig. 6 is a detail view of the transfer mechanism for the locked postage totalizer.

Fig. 7 is a detail view of the device for locking the machine against operation while the totalizer is being unlocked.

Fig. 8 is a detail view of the mechanism for locking the machine against operation when the totalizer exceeds its set predetermined capacity.

Fig. 16 is a detail view of the upper totalizer engaging mechanism.

Fig. 17 is a detail view of the upper totalizer engaging cam in its operated position.

Fig. 18 is a detail view of the mechanism for rocking the zero stop arms to ineffective positions by movement of the control lever out of its add position.

Fig. 19 is a detail view showing the interlock between the repeat key and control lever.

Fig. 22 is a detail view of the machine release mechanism, the postage totalizer engaging mechanism, and the control lever.

Fig. 23 shows the mechanism for engaging the postage totalizer on read or sub-total operations.

Fig. 24 shows the mechanism for engaging the postage totalizer on add operations.

Fig. 25 is a fragmentary view of the non-repeat pawl.

Fig. 26 is a view in elevation of the printing mechanism.

Fig. 27 is a facsimile of the postage label printed and issued by the machine.

Fig. 32 is a fragmentary view in elevation of the slip chute.

Fig. 33 is a detail view of the mechanism for opening the slip chute by movement of the control lever to the "read" position.

Fig. 34 is a detail view of the postage label chute.

Fig. 35 is a small scale view showing the method of locking the cabinet onto the machine.

Fig. 36 is a section on line 36—36 of Fig. 34 looking in the direction of the arrows.

Fig. 37 is a facsimile of a section of the audit strip.

Fig. 38 is a facsimile of a slip printed in the machine.

*General description*

Figure 1:
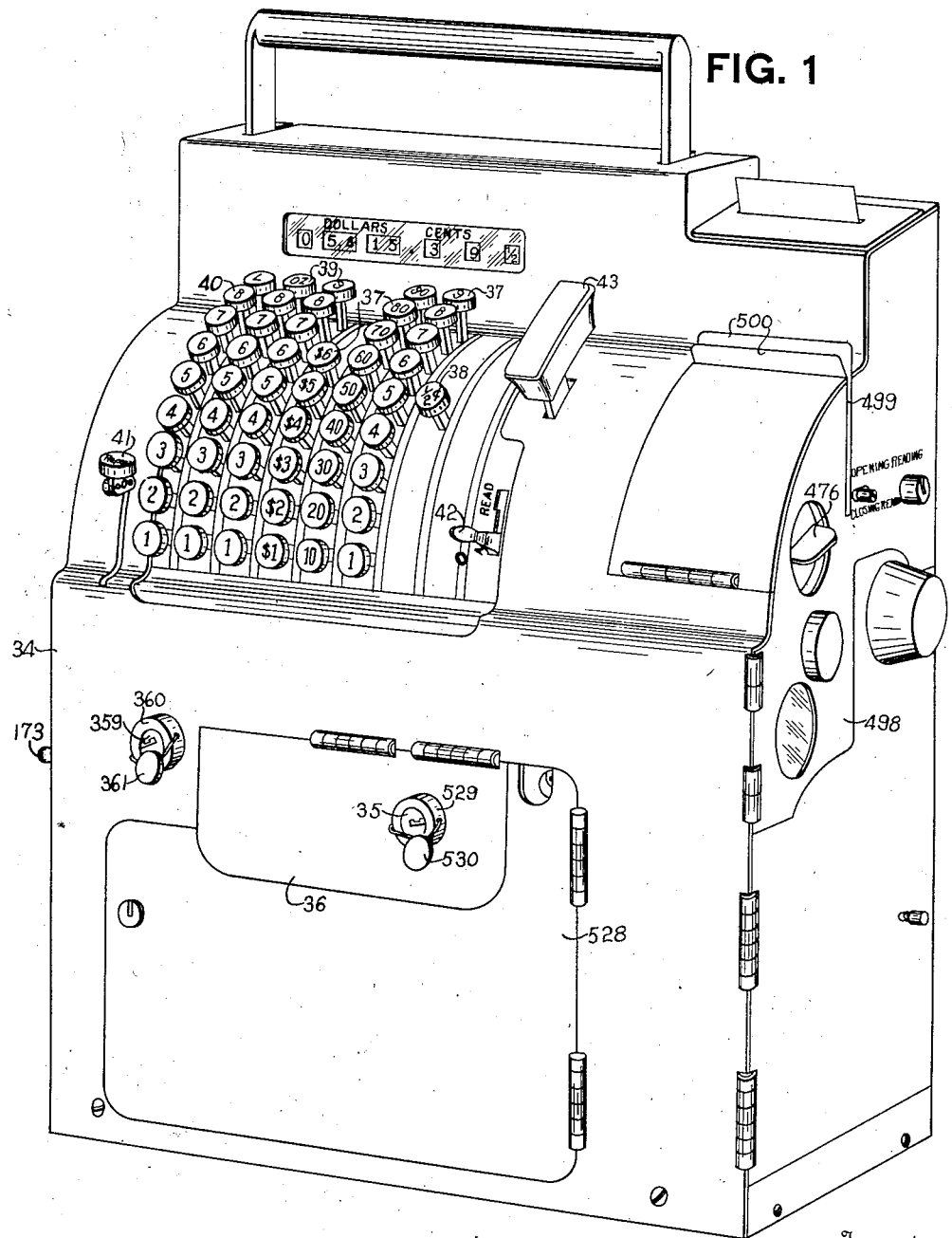
Fig. 1 is a perspective view, in reduced scale, of the machine with the cabinet or casing locked on the machine and the lock sealed.

The machine disclosed in this application is adapted for recording postage and for printing and issuing gummed postage labels for use on first, second, third and fourth class mail. It is particularly adapted for use where heavy packages of different sizes and weights have been weighed to determine the amount of postage required.

The machine of the present invention is small, compactly arranged, and is encased in a suitable cabinet. This cabinet is locked on the machine by two locks, the key to one of which locks is in the possession of the postal authority. The key to the other lock is retained by the manufacturer of the machine, and is used only when it is necessary to remove the cabinet from the machine in order to repair or adjust the machine. A keyboard having rows or banks of manipulative keys is provided for controlling the registration of the amounts of postage on two totalizers with which the machine is provided.

Other rows of keys are provided to control the printing of the zone numbers and weights of the packages. A lever projects through the machine cabinet to the right of the rows of keys to control the machine to perform adding or sub-totalizing operations, it being impossible in the present machine to reset either of the totalizers to zero. A motor release bar is located to the right of the keyboard and slightly above the control lever. To the left of the keyboard is located a repeat key, depression of which controls the machine to repeat exactly the last operation. This key also, as an incident to its depression, releases the machine for operation. A manually-operated key release lever, the knob of which projects into the cabinet at the left side of the machine, is also provided to release any key depressed through error.

The usual differential mechanism is provided and is operated under the control of the manipulative devices to add amounts onto the totalizers and to adjust the type carriers from which are printed the amounts and other data corresponding to the keys depressed.

The machine is provided with two separate and independent totalizers, one of which totalizers is located in that position of the machine usually occupied by indicators, there being no indication provided in the instant machine. This totalizer is a reading totalizer and is constantly visible through a sight opening in the cabinet. The purpose of this totalizer is to accumulate the amounts of the postage issued by the machine. This totalizer cannot be reset to zero and movement of the control lever to the "read" position disables the engaging mechanism for the reading totalizer. Consequently this totalizer can be engaged with its actuators only when the machine is set to add.

The other totalizer is substantially the same structurally, and is located in the same position, as the totalizers in the machines of the patent mentioned above. This totalizer is engaged with the actuator during adding operations and reading operations under the control of the control lever. On adding operations the totalizer accumulates the amount of postage issued, according to the amount keys depressed. This totalizer is set by the postal authority to issue a predetermined amount of postage, and when this amount is exhausted the machine locks automatically against operation. The machine is then taken to the postoffice where the postmaster, who has in his possession the key to one of the sealed locks, releases the machine by breaking the seal and operating the lock. On reading operations the total standing on this totalizer is cleared therefrom, set on the type wheels, and printed on an inserted slip or Government form, and on an audit strip, which strip is locked in the machine. The total is then replaced on the totalizer which may not otherwise be manipulated.

The printing mechanism is located at the right side of the machine. This mechanism prints the information set up on the keyboard, and in addition thereto it prints the date, consecutive number, permit or meter number, "U. S. postage paid", and the city and State from which the package was mailed, on a strip of gummed check paper fed from a supply roll in the machine. After the impressions are made, the printed portion of the check paper is severed from the strip, forming a postage label, which is then fed out of the machine. As these labels are issued, they are removed, moistened and attached to the proper parcels by the operator.

The data set up on the keyboard are also printed on a permanent record strip which is retained in the machine under lock and key. At certain intervals this strip may be removed for checking purposes either by the postal authorities or by the duly authorized representative of the business concerns which avail themselves of permit mailing, as provided under Section 452 of the Postal Laws and Regulations.

Such machines are usually operated by suitably designed electric motors, or in event of failure of the electric current, the machine may be operated manually by a crank provided for that purpose and located at the right side of the machine.

Main frame work

The main body of the machine is supported between a frame work comprising a right side frame 30 (Fig. 15), and a left side frame 31 (Figs. 3 and 15) mounted on a base (not shown). These side frames are joined by a back frame 32 (Fig. 3) at the rear of the machine, and by a cross bar 33 (Figs. 3, 7 and 8) located at the lower front part of the machine. A cabinet or casing 34 (Fig. 1) having suitable openings therein for keys, operating crank, key release lever and other control members, and a sight opening for the reading totalizer, etc., encloses the machine and is secured to the base (not shown) of the machine by suitable screws or other fastenings. In addition to the usual fastenings for the cabinet, a lock 35 secured to a door 36 (Figs. 1 and 35) on the cabinet, is provided to lock the cabinet on the machine in such a manner that the door 36 may not be opened or the cabinet removed from the machine until the lock 35 is operated. This lock and the manner in which it is operated will be described in detail later.

Keyboard

The keyboard of the machine selected to illustrate the present invention is similar, in the key arrangement, to the keyboard disclosed in the above mentioned Robertson application, Serial No. 419,938.

In addition to a plurality of banks of amount keys 37 (Figs. 1, 2 and 3) there is provided a bank containing a single key 38 adapted to be depressed in order to register amounts of one-half cent. To the left of the amount key 37 there are banks of "weight" keys 39, and a bank of "zone" keys 40, which control their respective differential mechanisms to set type elements to print characters indicating the weight of the parcel, and the zone to which it is to be shipped.

A repeat key 41 (Figs. 1, 19 and 20) projecting through a slot in the cabinet, to the left of the main keyboard, controls the machine to repeat exactly the registration of the last amount set up on the keyboard and entered into the machine.

A lever 42 (Figs. 1, 18, 19 and 22) projecting through a slot in the cabinet to the right of the main keyboard, conditions the machine to perform adding and sub-totalizing operations. The usual motor release bar 43 is located above the conditioning lever 42. Depression of this bar 43 releases the usual clutch mechanism, closing the electric circuit to the drive motor, and frees the mechanism for operation. The amount, weight and zone keys are the same in structure and in operation as the amount keys disclosed in the above mentioned Robertson patent. For this reason it is thought that a detailed description of one bank of keys, an amount bank, will be sufficient for a full understanding of the key mechanism of the present machine.

The keys 37 (Fig. 3) of each of the several banks of amount keys, the weight keys 39 (Fig. 1) and the zone keys 40, are slidably mounted in a key frame 44 (Fig. 3), shown partly broken away for clearance, having its upper and lower ends supported on cross rods 45 and 50, respectively, extending between the side frames 30 and 31 of the machine. Each of the keys 37 is provided with a spring 51, only one being shown, coiled about its shank to normally retain the keys in their undepressed positions, and to return the depressed keys to their undepressed positions when they are released.

Each of the amount keys 37 carries a laterally projecting pin 52, which, upon depression of its key, wipes along the beveled edge of a shouldered projection 53 on a flexible detent bar 54, slidably mounted on studs 55 and 56 in the key frame 44. There are as many projections 53 on the detent bar 54 as there are keys in the bank, that is, nine. The pin 52 on the particular key depressed, as it wipes by its associated projection 53, slides the detent bar 54 toward the left against the tension of a restoring spring 57. When the key pin 52 has passed the shoulder on the projection 53, the spring 57 partially restores the detent bar 54, hooking the shouldered projection over the key pin 52 of the depressed key, thus retaining said key in depressed position until another key in the same bank is depressed, or until the detent bar 54 is shifted toward the left to release the depressed key. This may be accomplished either manually or automatically as will be brought out later. When the key pin 52 is thus released from the detent bar 54, the spring 51 returns it to its normal undepressed position.

Each of the banks of amount keys is provided with a locking bar 58 (Fig. 3) slidably on the studs 55 and 56, to lock the depressed amount key in its depressed position and the undepressed amount keys against depression during operation of the machine. Mechanism, to be described later, is operated as soon as the machine is released for operation, to shift the locking bar 58 upwardly and toward the right to engage hooked projections 59 thereon with the key pins 52, the projection associated with the depressed key passing above the key pin 52 on this key to hold it in depresed position, and the projections associated with the remainder of the keys passing beneath the pins 52 to prevent depression of the undepressed keys during the operation of the machine. A restoring spring 60 normally holds the locking bar 58 in its normal position with the upper walls of the slots therein bearing against their respective studs 55 and 56.

Mechanism to be later described, operates near the end of the operation to shift both the detent bar 54 and the locking bar 58 toward the left to free the depressed key, which is immediately restored to its normal undepressed position by its spring 51.

Each bank of amount keys is provided with a zero stop arm 61 (Fig. 3) pivoted on a stud 62 in the key frame 44, to stop the differential mechanism at zero position when the machine is operated with no key depressed in the particular bank or banks. A spring 63 normally holds the stop arm 61 against a stop stud 64 projecting laterally from the detent bar 54. When the detent bar is shifted by depression of one of the keys 37 the stud 64 cams the stop arm 61 clockwise against the tension of a restoring spring 63 to ineffective position.

When the depressed key 37 is released near the end of the operation, and the detent bar 54 is restored to its normal position, the spring 63 rocks the zero stop arm 61 counter-clockwise to its normal position.

Figure 2:
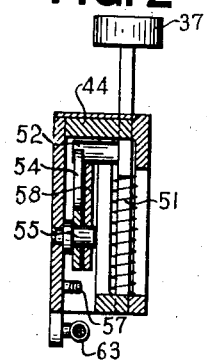
Fig. 2 is a sectional view taken on line 2—2 (Fig. 3), through one of the amount key frames and looking in the direction of the arrows.

It will be noted by inspection of Fig. 1, that there are only six amount keys provided in the dollar denominational bank. It is to be understood, however, that the number of keys in the several banks and the number of banks of amount keys may be varied without departing from the spirit of the invention.

Key release mechanism

It is desired to release all of the depressed keys near the end of each adding operation. To do so, it is necessary to lower the detent bars 54, which are spring urged upwardly to flexibly hold the depressed keys in depressed positions, and also to lower the locking bars 58 which are mechanically raised when the machine is released, to lock all of the keys against manipulation during the operation of the machine.

A series of fingers 46 (Fig. 3), one associated with each bank of keys, is fast on a shaft 47 journaled in the machine side frames 30 and 31. Each finger 46 is adapted to cooperate with a stud 48 on the lower end of the detent bar 54 for its particular bank. Also, the fingers 46 are adapted to cooperate with studs 49 carried by slotted arms 67 pivoted on the shaft 47. Each slotted arm 67 embraces a stud 69 projecting from the lower end of its associated locking bar 58, which bars, as stated above, are shifted upwardly when the machine is released, carrying the studs 49 to points just beneath their respective fingers 46.

At the proper time, near the end of each operation, the shaft 47 is rocked first clockwise and then counter-clockwise to normal through a constant extent of travel. At the clockwise movement of the shaft 47, the fingers 46 come into contact with the studs 48 and 49 on the detent bar 54 and the slotted arm 67 respectively, and continued clockwise movement of the fingers lowers the detent bars 54 and, rocking the slotted arms 67 clockwise, lowers the locking bars 58, thus releasing the depressed keys to the action of their springs 51.

Figure 20:
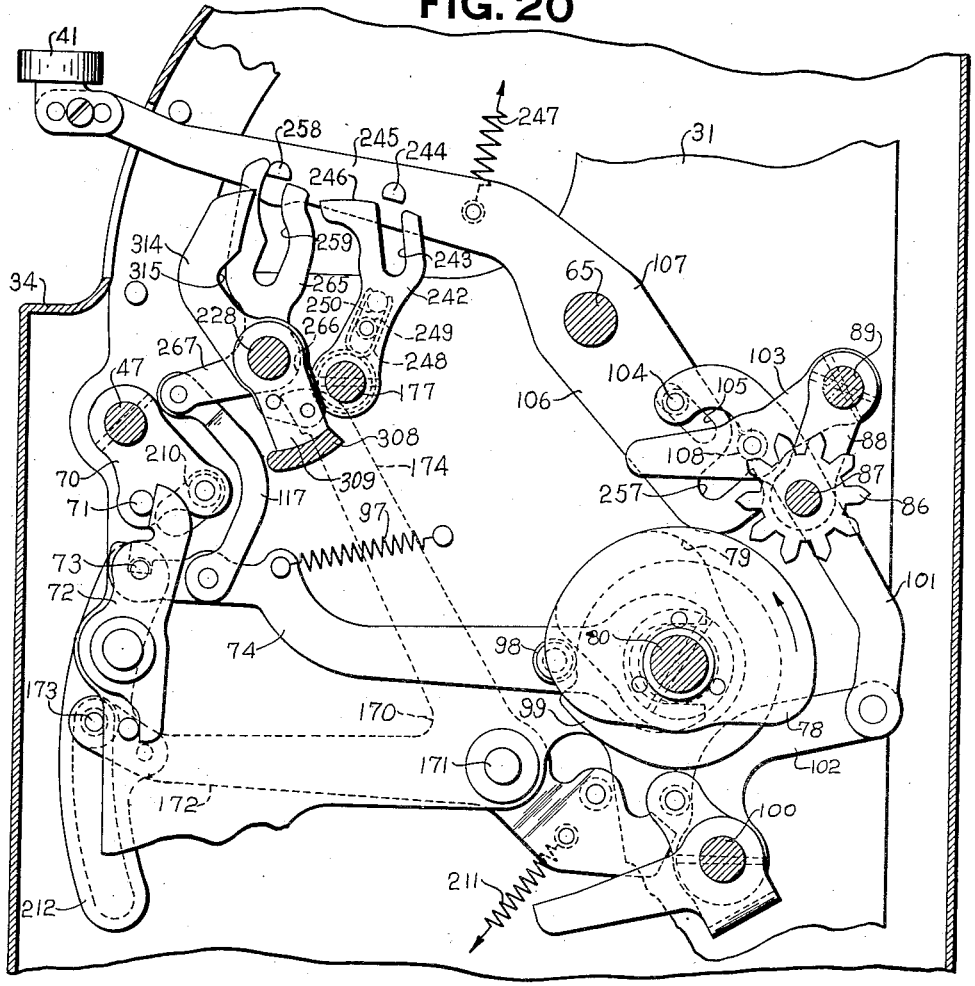
Fig. 20 is a detail view of the repeat key and some of the devices operated thereby, together with the key release mechanism.

The mechanism for rocking the shaft 47 will now be described. This mechanism is best shown in Fig. 20, and includes an arm 70 secured to the shaft 47. This arm carries a stud 71 with which cooperates the formed end of a lever 72 pivotally supported on a stud projecting from the side frame 31. A stud 73 on the lever 72 normally is embraced by a recess in the upper edge of a pitman 74 having its right-hand end bifurcated to straddle a drive shaft 80 journaled in the machine side frames 30 and 31. A spring 97 maintains a roller 98 carried by the pitman 74, in contact with a cam 99 secured on the drive shaft 80. Near its left-hand end, the pitman 74 is connected by a link 117 to an arm 267 of a lever 266 for a purpose to be later described.

The shaft 80, and consequently the cam 99, makes one counter-clockwise rotation (Fig. 20) at each operation of the machine, near the end of which rotation the cam 99 thrusts the pitman 74 leftwards, thus rocking the lever 72 counter-clockwise, and by the stud 71, the arm 70 and shaft 47 are rocked clockwise for the purpose set forth above, namely, to release the depressed keys.

Quite near the end of the operation, the cam 99 suddenly permits the spring 97 to restore the pitman 74 towards the right to its normal position, rocking the lever 72 clockwise to its normal position. As this occurs the springs 57 (see Fig. 3) draw the detent bars 54 upwardly to their normal positions, the studs 48 in the lower ends of said bars rocking the fingers 46, and consequently the shaft 47 counter-clockwise (Figs. 3 and 20) to normal.

Manual key release

It sometimes happens that the wrong key or keys are depressed and it is desired to release all of the depressed keys manually. This result is accomplished by a manual key release lever 170 (Fig. 20) pivoted on a stud 171 in the frame 31 of the machine. One arm 172 of the lever 170 carries a stud or knob 173 projecting through a slot in the cabinet 74 of the machine to form a convenient handle for the release lever.

When the knob 173 is pulled downwardly, rocking the lever 170 counter-clockwise (Fig. 20), the other arm 174 of the lever 170 comes into contact with a stud 210, projecting from the arm 70 through a clearance slot in the frame 31 and into the path of the arm 174, thus imparting the same releasing movement to the arm 70, the shaft 47 and the fingers 46 as is given these parts by the cam 99, pitman 74 and lever 72.

When the knob 173 is released, a spring 211 restores the lever 170 clockwise to its normal position.

A shield 212 secured to the arm 172 constantly covers the opening 174 in the cabinet to prevent the introduction of any foreign object for the purpose of wrongfully manipulating the totalizer or its appurtenant devices.

Amount differentials

The amount keys 37 controls the differential mechanism to set type carriers and to add amounts on the totalizer. The differential mechanism provided in the machine chosen to illustrate the present invention is substantially the same as that disclosed in the above mentioned Robertson patent and for this reason only a brief description thereof will be included in this specification.

The differentials are of the spring-actuated type and are identical for the amount banks. The differentials associated with the weight and zone banks embody a few differences in structure and operation, which will be fully described in due course.

The amount differentials are mounted on a rock shaft 65 (Fig. 3) journaled in the side frames 30 and 31 of the machine. Since all of the amount differentials are alike, it is thought that the description of one will be sufficient.

Depression of one of the keys 37 thrusts its inner end into the path of a projection 66, extending forwardly from an adding segment 68 pivoted on the rock shaft 65. There is one segment 68 for each bank of amount keys, and one for each of the banks of weight keys. The differential segments 68 associated with the banks of weight keys are known as overflow differentials.

When a key 37 is depressed it also displaces the zero stop arm 61, which normally prevents advance of the adding segment 68 beyond its zero position. A universal rod 75, carried by a pair of arms 76, only one of which is shown, fast on the rock shaft 65, normally restrains the adding segment 68 against the influence of a spring 77, which tends to advance the segment. The universal rod 75 is operated at the proper time during the operation of the machine by a pair of cams 78 and 79 (Fig. 20) fast on the drive shaft 80 journaled in the machine side frames 30 and 31.

Figure 21:
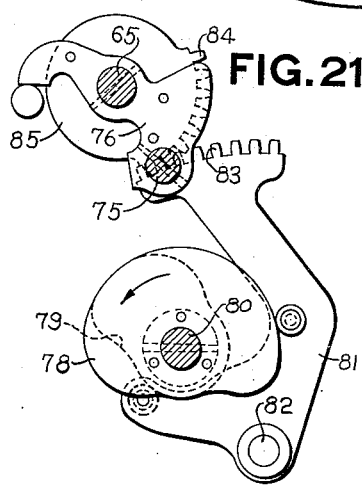
Fig. 21 is a detail view of the differential actuator drive mechanism.

The cams 78 and 79 rock a bell crank lever 81 (Fig. 21), pivoted on a stud 82, projecting laterally from the side frame 31, first counter-clockwise, and then clockwise to normal through a constant extent of travel. Teeth 83 on one arm of the bell crank lever 81 mesh with teeth 84 on a disk 85 secured to the arm 76, to rock said arm, its companion arm (not shown), the rock shaft 65 and the universal rod 75, first clockwise and then counter-clockwise to home position.

As the cams 78 and 79 rock the universal rod 75 clockwise, the toothed adding segment 68 advances with the rod 75 under the influence of the spring 77 until it is arrested by the inner end of the depressed key, or if no key is depressed, by the zero stop arm 61 for that particular bank of keys. The universal rod 75, however, completes its clockwise stroke.

Setting segments 90 are provided to set the type wheels differentially to their new positions, as determined by the particular data set up by the keys on the keyboard. The setting segments 90 are normally coupled to the adding segments 68 by broad coupling pinions 86 meshing with both.

Before the adding segment 68 can be set under the control of the depressed key 37 or the zero stop arm 61, and before the type wheel or setting segment 90 can be restored to zero position, it is necessary to disengage the coupling pinions 86 from those segments.

The pinions 86 are pivoted on a rod 87 carried by arms 88, only one of which is shown, fast on a shaft 89 journaled in the machine side frames 30 and 31.

At the beginning of the operation of the machine, just before the adding segment 68 commences its clockwise movement, mechanism disclosed in Figs. 20 and 22 rocks the coupling pinions 86 out of mesh with the segments 68 and 90 to disconnect these segments so that when the spring 77 advances the adding segment 68 clockwise under the control of the depressed key or the zero stop arm, the setting segment 90 may be restored to its normal position by the universal rod 75 on its clockwise travel.

The coupling pinions 86 are disengaged from and reengaged with the segments 68 and 90 by a cam groove 91 in a cam 92 fast on the drive shaft 80. The cam groove 91 embraces a roller 93 on a pinion engaging lever 94, fast on a shaft 100 supported in the machine side frame. The counter-clockwise rotation of the cam 92 rocks the lever 94 and the shaft 100 clockwise. A link 101 (Fig. 20) connects an arm 102 fast on the shaft 100 to an arm 103 fast on the shaft 89. A stud 104 on the upper end of the link 101 projects through and is guided by a slot 105 in an arm 106 of a repeat key lever 107 pivoted on the shaft 65. A notch in the link 101 normally embraces a stud 108 projecting laterally from the arm 103.

When the cam 92 (Fig. 22) rocks the lever 94 and the shaft 100 clockwise from the position in which they are shown in this figure, the arm 102 (Fig. 20) is also rocked clockwise, lowering the link 101, thereby rocking the arm 103 and shaft 89 counter-clockwise, carrying the rod 87, upon which the coupling pinions 86 are mounted, counter-clockwise to move the pinions out of mesh with the totalizer actuator segments 68 and the setting segments 90 for each bank of keys.

When the pinions 86 are disengaged from the segments 68 and 90 they are moved into engagement with an aliner 110 (Fig. 3) secured to the back frame 32, to hold the pinions against rotation while disengaged from the segments, thereby insuring proper meshing of the pinions when they are re-engaged with the segments 68 and 90.

As the adding segment 68 travels clockwise under the influence of the spring 77, the projection 66 thereon strikes the inner end of the depressed key, thereby arresting the movement of the segment 68. The restraining and restoring rod 75 continues its clockwise travel, however, to restore the setting segment 90 to its home position, and as soon as this segment reaches its home position, the cam 92 (Fig. 22) actuates the coupling pinion operating mechanism to reengage the coupling pinions 86 with their respective segments 68 and 90.

At the same time the coupling pinions 86 are reengaged with their segments, mechanism is operated to engage the totalizer with the adding segments 68, so that when the rod 75 rocks the segments 68 counter-clockwise, an amount equal in value to the value of the keys depressed is accumulated thereon. At the same time the amount under control of the keys is set up in the printer in a manner to be later described.

*Weight and zone differential mechanisms*

On adding or postage issuing operations it is desired to utilize the differentials associated with the banks of weight keys merely to set type wheels to print the weight of the parcel. In some types of machines it is necessary to utilize differential mechanism in order to transfer or carry over amounts into what are usually termed "overflow" totalizer wheels. In the instant invention the overflow amounts are carried into the overflow wheels by the regular transfer mechanism. For this reason segments 109 (Fig. 5), adjustable differentially under the control of the weight and zone keys, are provided to communicate the differential setting to the type wheels. These segments 109 are not provided with teeth to cooperate with the totalizer wheels. Two overflow wheels only are provided, and special actuators 111, one associated with each of the weight differentials are provided to cooperate therewith when it is desired to take a sub-total from the totalizer.

The actuators 111 are normally disconnected from the differential segments 109 and held in their home positions. Movement of the control lever 42 from its "add" position to its "read" position latches the actuators 111 to the differential segments 109, so that the latter are set under the control of their respective totalizer wheels on "read" or sub-total operations.

The mechanism for coupling each actuator 111 to its associated segment 109 includes a latch 260 pivotally carried by the actuator 111. The latch 260 carries a stud 261 projecting through an angular slot in an arm 262 fast on a shaft 177.

Movement of the control lever 42 from its "add" position to its 'read" position rocks the shaft 177 clockwise (Fig. 5) by mechanism to be described later. Clockwise movement of the arms 262 rocks the latches 260 also clockwise to hook notches therein over studs 263 projecting from their respective segments 109.

Now, when the rock shaft 65 carries the universal rod 75 clockwise, the spring 77 draws the segments 109 therewith; the latches 260 now coupling the actuators to these segments are also rocked clockwise therewith. As the latches 260 travel upwardly, the studs 261 wipe along the inner arcuate edges of the weight key frames 44, thus maintaining the latches 260 hooked over the studs 263.

After the operation is completed the shaft 177 is rocked counter-clockwise to normal, disengaging the latches 260 from the studs 263, and positioning the studs 261 beneath a beveled corner of the keys frames, thus preventing accidental displacement of the actuators on adding operations.

Coupling pinions 86 are provided to couple the segments 109 for both weight and zone differentials to their respective setting segments 90. These coupling pinions are mounted on the rod 87 so that they swing with the coupling pinions for the amount banks.

Totalizers

The machine chosen to illustrate the present inventions differs from the machine of the above mentioned application, Serial No. 419,938, in that but two totalizers are provided. These two totalizers are so arranged that both engage their actuating mechanism on all adding operations. These totalizers may not be selected by the operator. By shifting the control lever 42 (Fig. 1) upwardly to the "read" position the operator sets mechanism in the machine to disable the engaging mechanism for the upper or permanent totalizer and changes the timing of the engagement of the issuing postage totalizer to read the amount of postage issued therefrom.

Figure 3:
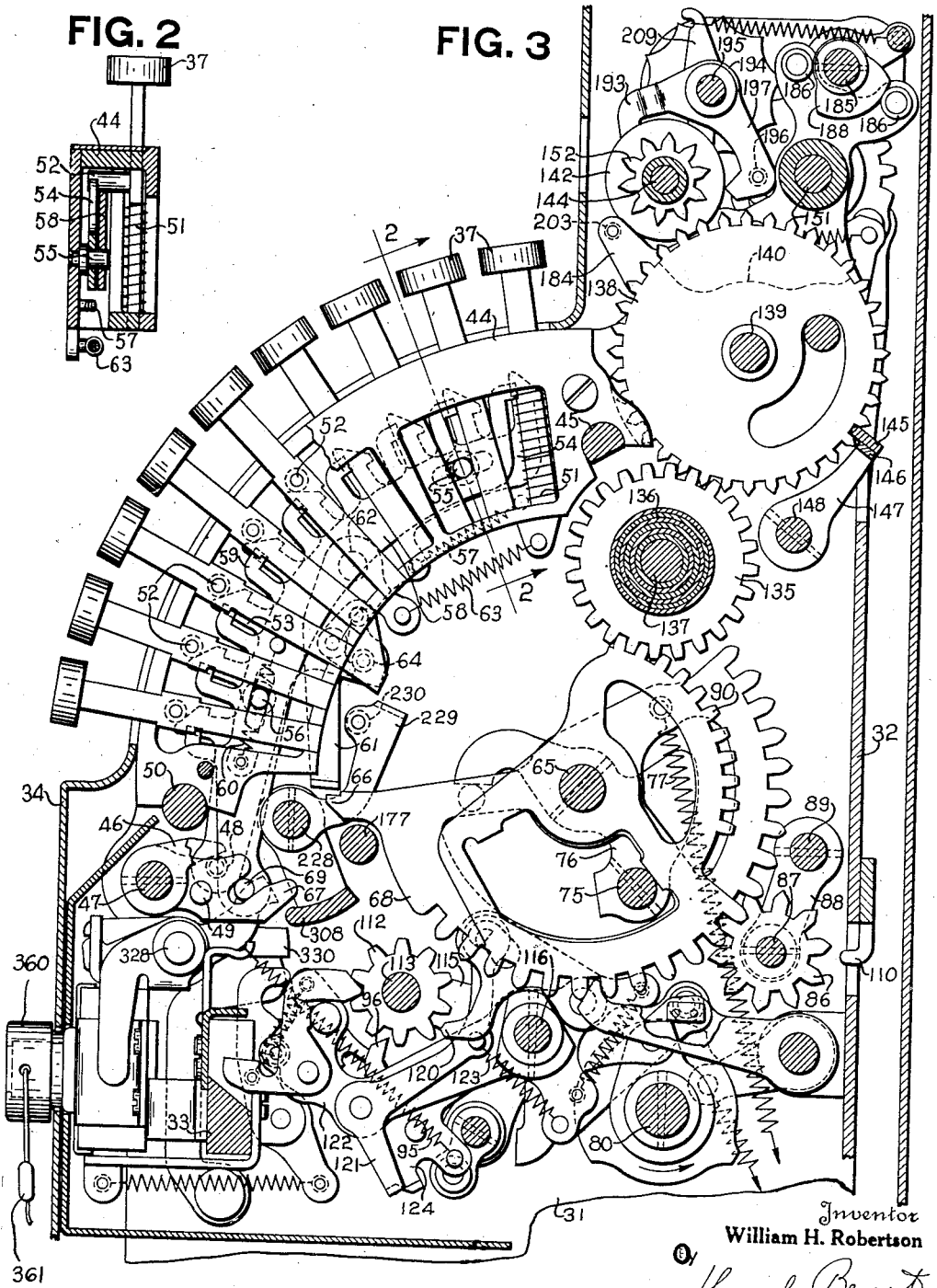
Fig. 3 is a sectional view through the machine taken to the right of one of the amount banks.
Figure 15:
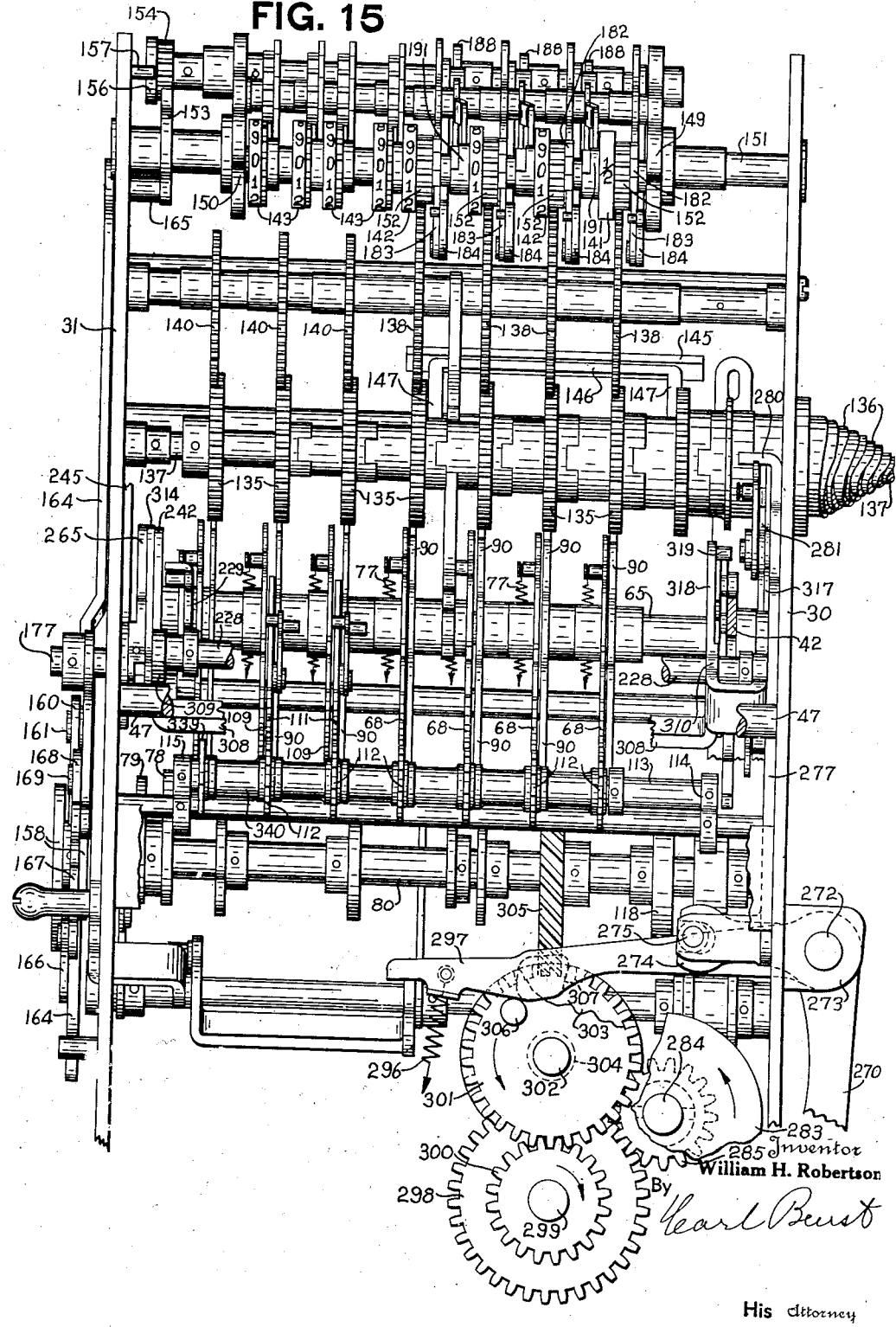
Fig. 15 is a skeletonized view in front elevation of the machine, showing particularly the differentials, the main cam line, the printer tube line and the upper totalizer.

The issuing postage-control totalizer comprises a wheel 112 for each of the adding segments 68 and two "overflow" wheels 112 (Figs. 3, 15 and 22). The wheels 112 are rotatably mounted on a rod 113 rigidly supported between a pair of arms 114 and 115 fast on a totalizer shaft 116 journaled in the machine side frames 30 and 31. The rod 113, together with the totalizer shaft 116 and the arms 114 and 115, form a rockable totalizer frame.

At the proper time on adding operations, upon rotation of the shaft 80, a cam 118 (Fig. 24) fast on said shaft and having a cam groove 119 in the face thereof cooperating with a roller 125 on a totalizer engaging arm 126 pivoted on the shaft 100, rocks the totalizer engaging arm 126 first clockwise and then counter-clockwise to normal. A stud 127 (Fig. 22) on a link 128, the forward end of which link is pivoted to the free end of an arm 129 fast on the totalizer shaft 116, projects into a slot 130 (Figs. 22 and 24) in an ear 131 on the arm 126 and bent at right angles thereto. The clockwise movement of the arm 126 draws the link 128 toward the rear and rocks the arm 129 and the shaft 116 clockwise, thereby rocking the totalizer frame to move the totalizer into engagement with the adding segments 68. A stud 132 on the link 128 projects through a bifurcated end of a totalizer engaging control lever 133 pivoted on a stud 134 projecting inwardly from the machine side frame 30, to guide the link 128 in its reciprocating movement to control the effectiveness of the totalizer engaging mechanism as will be described later.

After the totalizer wheels are engaged with the segments 68, by the mechanism described above, the cams 78 and 79 (Fig. 21) rock the universal rod 75 counter-clockwise to return the segments 68 to home positions, and since the totalizer wheels 112 are now engaged with their respective adding segments, the wheels are rotated to accumulate thereon the amount set up on the keyboard. Also, the setting segments 90 are rotated by the segments 68, through the coupling pinions 86, a number of steps equal to the number of steps of movement given the adding segments on their counter-clockwise movement, which corresponds to the value of the particular keys depressed.

After the adding segments 68 arrive at their normal or home positions, the cam 118 (Fig. 24) operates the arm 126 to disengage the totalizer from the adding segments.

The usual transfer or carry mechanism is provided to advance the totalizer wheel of higher order one step of movement when the wheel 112 of next lower order passes from "9" to "0". This transfer mechanism is fully disclosed in the above mentioned Robertson Patent 1,816,263 therefore only a brief description thereof will be included in this specification.

As the totalizer wheel 112 (Fig. 6) passes from "9" to "0", a tripping tooth thereon rocks a restraining pawl 120 (Fig. 6) to release a tripping pawl 121 pivoted on an arm 122 fast on the totalizer shaft 116 to the action of its spring 123, which immediately rocks the tripping pawl 121 clockwise to free a transfer arm 124, pivoted on the totalizer shaft 116, to the influence of a spring 95. This spring rocks the arm 124 clockwise about its pivot 116 (as viewed in Figs. 6 and 8) and by a transfer pawl 96 pivotally carried on the transfer arm 124, advances the totalizer wheel 112 of next higher order one step of movement.

However, since this tripping of the transfer device occurs while the totalizer is engaged with the adding segments 68, mechanism, fully described in the above mentioned Robertson Patent No. 1,816,263, is provided to delay the transfer until after the totalizer is disengaged from the adding segments 68.

The setting segments 90 on their counter-clockwise travel set the type carriers to print the characters indicating the zone, weight and amount.

Teeth on the setting segments 90 mesh with gears 135 (Figs. 3 and 15) fast on the ends of a plurality of nested tubes 136 surrounding a shaft 137 suitably supported in the machine. Each gear 135 meshes with a totalizer actuator gear 138 for the upper totalizer. The totalizer actuator gears 138 are pivoted on a shaft 139 supported in the side frames 30 and 31. The gears 135 for the zone and weight banks of keys mesh with partial gears 140 rotatably mounted on the rod 139. These gears 140 do not cooperate with the upper totalizer, but are used on repeat operations, as will be fully brought out later.

Upper totalizer

The upper totalizer includes a series of reading totalizer wheels 141, 142 and 143 (Figs. 3 and 9 to 15), rotatably mounted on a rod 144 carried between a pair of totalizer frames 149 and 150, loosely mounted on a rod 151 extending between the side frames 30 and 31 of the machine. Gears 152, one secured to the side of each of the wheels 141 and 142, are adapted at the proper time to be brought into engagement with the totalizer actuator gears 138, so that the amount corresponding to the amount set up on the keyboard may be added onto the upper totalizer.

The mechanism for engaging the upper totalizer wheels with and disengaging said wheels from the actuators 138 is best shown in Figs. 16 and 17. This mechanism includes a segment gear 153 journaled on the shaft 151, said segment gear 153 meshing with a gear 154 secured on a shaft 155 journaled in the upper totalizer frames 149 and 150. Secured to the shaft 155 is a cam 156 cooperating with a pair of studs 157 projecting inwardly from the left side frame 31 of the machine (see Fig. 15).

At the proper time on adding operations the segmental gear 153 (Fig. 16) is rocked counter-clockwise, rocking the gear 154, shaft 155, and the cam 156, clockwise. The configuration of the cam 156 is such that, at the proper time, this cam, operating on the stationary studs 157, swings the shaft 155 and the frames 149 and 150 counter-clockwise to carry the totalizer gears 152 into mesh with the totalizer actuator gears 138. The gears 138 are then rotated according to the keys depressed, or according to the keys set on the previous operation if the present operation is a repeat operation, thus rotating the gears 152 clockwise and advancing the totalizer wheels a number of steps equal in value to the values of the particular keys depressed.

An aliner is provided to aline the actuators 138 in their adjusted positions after they have been set. This aliner is normally in engagement with the teeth on the actuators 138. It is disengaged therefrom before the actuators are adjusted, and reengaged therewith immediately after said actuators have been set.

This aliner includes an aliner bar 145 secured to a bail 146 carried by a pair of arms 147 secured on a shaft 148 journaled in the side frames. The shaft 148 is rocked clockwise to disengage the aliner and then counter-clockwise to reengage it at the proper time by mechanism to be described later.

The segmental gear 153 is then rocked clockwise to its normal position, rotating the gear 154, shaft 155 and the cam 156 counter-clockwise to normal, and due to the cooperation of this cam with the studs 157, the totalizer frames 149 and 150 are rocked clockwise, which disengages the totalizer gears 152 from the actuators 138.

The mechanism for oscillating the segment gear 153 (Fig. 16) to engage and disengage the upper totalizer with the actuators 138, will now be described.

The segment gear 153 is operated by a pair of cams 158 (Fig. 16) secured to the drive shaft 80. These cams cooperate with a pair of spaced rollers 159 on a multiple-armed lever 160 pivoted on a stud 161 projecting from the left side frame 31. One arm 162 of the multiple-armed lever 160 carries a stud 163 projecting through an open slot in a pitman 164 having its upper end pivotally connected by a stud 165 to the segment gear 153. The stud 165 projects through an opening in the side frame 31. (See Fig. 15.) A link 166 (Fig. 16) connects the lower end of the pitman 164 with one arm 167 of a bell crank 168 pivoted on a stud 169 projecting from the frame 31.

The bell crank 168 is operated by the control lever 42 when said lever is moved to its "read" position to disable the upper totalizer engaging mechanism on such operations.

At the proper time on adding operations the cams 158 (Fig. 16) rock the multiple-armed lever 160 counter-clockwise, raising the link 164 to rock the segmental gear 153 counter-clockwise, as above described, thus engaging the upper totalizer with the actuators 138. After the amount is added onto the upper totalizer the cams 158 rock the multiple-armed lever 160 clockwise to normal, lowering the pitman 164, and restoring the segmental gear 153 clockwise to normal and disengaging the upper totalizer from the actuators.

The cams 158 operate the multiple-armed lever 160 at each operation of the machine, but since it is not desired to engage the upper totalizer with its actuators on "read" operations, the bell crank 168 is operated by movement of the control lever from its "add" to its "read" position to disconnect the pitman 164 from the arm 162 of the multiple-armed lever 160. This disabling is effected in the following manner.

A stud 175 (Fig. 16) on an arm 176 secured to the shaft 177 projects through a cam slot 178 in the other arm 179 of the bell crank 168. The shaft 177 is rocked clockwise, as viewed in Fig. 16, by manipulation of the control lever 42, in a manner to be described later. Clockwise movement of the shaft 177, and consequently the arm 176, by the stud 175, rocks the bell crank 168 clockwise drawing the link 166 toward the left. This rocks the pitman 164 clockwise about the stud 165 at its upper end, disconnecting the pitman from the stud 163 in the arm 162, and engaging a slot 180 in the lower end of the pitman 164 with a stud 181 projecting from the side frame 31 of the machine, thus restraining the pitman against vertical movement while said pitman is disconnected from the stud 163.

Restoration of the control lever 42 to its add position restores the shaft 177 and consequently the arm 176 counter-clockwise to normal, the stud 175 rocking the bell crank 168 counter-clockwise, thrusting the link 166 toward the right to disconnect the slot 180 from the stud 181 and engaging the link 164 with the stud 163 on the arm 162 of the multiple-armed operating lever 160.

*Transfer mechanism for the upper totalizer*

A transfer or carry mechanism is provided to advance the totalizer wheel of higher order one step of movement when the wheel 142 of lower order passes from "9" to "0". This mechanism for the upper totalizer differs somewhat from the transfer mechanism disclosed above for the lower totalizer, and a full description thereof will now be given.

Secured to each of the gears 152 (Figs. 9, 10, 11 and 15) for each of the wheels 141 and 142 is a ratchet 182 with which cooperates a transfer pawl 183 pivotally carried on an arm 184 of a transfer lever 185 pivoted on the shaft 151. A pair of rollers 186 carried on the other arm 187 of each of the levers 185 cooperates with one of a series of transfer cams 188 fast on the shaft 155. The pawls 183 normally cooperate with the ratchets 182 in the manner illustrated in Fig. 9, to lock the totalizer wheels 142 so that they may not be manipulated.

The shaft 155, it will be recalled, is oscillated by the mechanism disclosed in Fig. 16, and rocks first clockwise and then counter-clockwise to normal. On its clockwise movement the cams 188 rock the levers 185 successively, beginning with the highest order wheel, which in this particular case is the one dollar wheel, counter-clockwise to withdraw the transfer pawls 183 from cooperative relation with their respective ratchets 182. The lever 185 for the dollar bank is rocked counter-clockwise first, followed by the lever 185 for the dime bank, and finally the levers 185 for the penny bank and for the one-half cent bank. It will be noted that only three cams 188 are provided, whereas referring to Fig. 15, it will be noted that four levers 185 are provided. The levers 185 for the penny bank and for the one-half cent bank are secured together by a hub 189, and therefore rock in unison. There is no cam 188 provided for the lever 185 in the one-half cent key bank. A pawl 183 (Fig. 14) carried by the arm 184 for this bank serves only as a locking pawl to lock the one-half cent totalizer wheel against manipulation. It will be noted by reference to Fig. 14, that the particular pawl 183 associated with the one-half cent totalizer wheel is secured to its arm 184 by a pin 190.

After the levers 185 are all rocked counter-clockwise, withdrawing the pawls 183 from cooperative relation with their respective ratchets 182, the totalizer having been engaged with the actuators 138 at approximately the same time, the totalizer wheels 141 and 142 are advanced according to the set-up on the keyboard. If during this adding operation any particular totalizer wheel passes from "9" to "0", the transfer mechanism is tripped to add one in the totalizer wheel of next highest order.

This tripping mechanism includes a tripping tooth 191 (Fig. 9) secured to the left-hand side (as viewed in Fig. 15) of each of the three lower order totalizer wheels 141 and 142. As a lower order totalizer wheel passes from "9" to "0" the tripping tooth 191 wipes by a nose 192 on one arm 193 of a lever 194 pivoted on a rod 195 carried in the upper totalizer frames 149 and 150, rocking the lever 194 clockwise. A stud 196 on the other arm 197 of the lever 194 projects through an open slot 198 in an arm 199 of a three-armed lever 200 pivotally carried on the lever 185. The rounded end of an arm 201 of the lever 200 is embraced by a bifurcated arm 202 of the pawl 183. Clockwise movement of the lever 194 rocks the three-armed lever 200 counter-clockwise and, by the rounded arm 201, rocks the arm 202 and consequently the pawl 183 clockwise to the positions in which these parts appear in Fig. 11.

Figure 10:
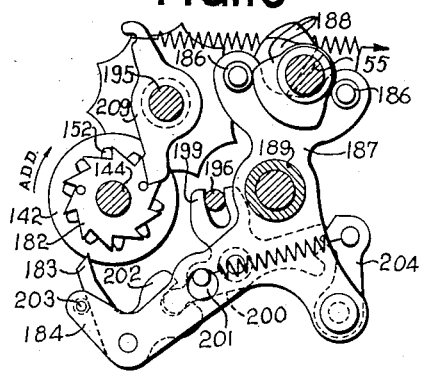
Fig. 10 is a detail view of a part of the transfer mechanism for the upper totalizer, showing the transfer arm in retracted position.
Figure 11:
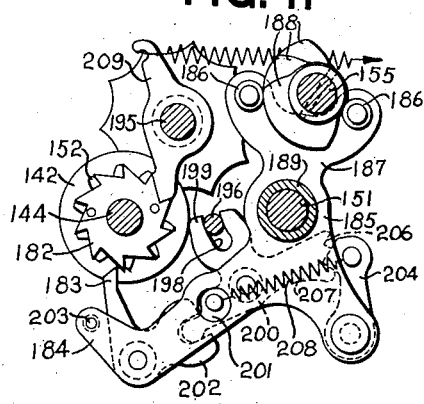
Fig. 11 shows the same mechanism as Fig. 10, but with the transfer pawl tripped.

Now, when the cam 188 for the particular bank or transfer lever 185 appearing in Figs. 10 and 11, rocks the lever 185 clockwise, obviously the pawl 183 engages the ratchet 182 (see Fig. 11) secured to the next higher order totalizer wheel, and as the lever 185 rocks clockwise the pawl 183 advances the ratchet one step of movement. At the end of the clockwise or restoring movement of the lever 185 a stud 203 projecting from the arm 184 of said lever comes into contact with the pawl 183 pressing this pawl against the ratchet 182 in such a manner as to lock the ratchet and consequently the totalizer wheel against movement in either direction.

As the transfer is effected, that is, as the lever 185 carries the pawl 183 clockwise to advance the totalizer wheel, the pawl 183 is rocked counter-clockwise about its pivot on the arm 184, thus restoring the pawl to its untripped position. The pawl 183, rocking counter-clockwise, rocks the three-armed lever 200 clockwise to normal, and by the slot 198 and stud 196 rocks the lever 194 counter-clockwise to its normal position. The lever 194, the lever 200 and the pawl 183 are held either in their normal positions or in their tripped positions by an aliner 204 pivotally carried on the arm 184 of the lever 185, engaging one of two notches 205 or 206 in the end of an arm 207 of the three-armed lever 200. A spring 208 constantly presses the pawl 204 into cooperative relation with one of said two notches 205 or 206.

To prevent retrograde movement of the totalizer wheels when the locking and transfer pawls 183 are out of engagement with the ratchets 182, retaining pawls 209 are pivoted on the rod 195 and cooperate with the ratchet 182 for each of the totalizer wheels 141 and 142.

It will be noted by inspection of Fig. 1 that the one-half cent key occupies the "5" position in its bank. Consequently when this key is depressed and the machine operated the one-half cent totalizer wheel is rotated five steps or spaces. Thus, it can be seen that every other time the machine is operated with the one-half cent key depressed, the tripping tooth 191 attached to the one-half cent key wheel, trips the transfer to the penny bank, resulting in the addition of one to this penny totalizer wheel.

Due to lost motion which may reside in the train of gears comprising the setting segment 90, the gear 135 and the totalizer actuator 138 (see Fig. 3), the totalizer wheel 142 may be slightly overthrown, particularly when the machine is operated rapidly. For instance, suppose the totalizer wheel were setting at "1" and "8" was added thereon. In this case the wheel rotating rapidly in a clockwise direction (Fig. 9) might overthrow sufficiently to carry the tripping tooth 191 into contact with the nose 192 on the lever 194, thus rocking this lever, and tripping the pawl 183. The totalizer wheel would then be restored to its proper position by the retaining pawl 209 or by the totalizer actuator 138, leaving the transfer tripped. Mechanism is provided in the present machine to restore the transfer mechanism to its normal position when it is tripped by overthrowing the totalizer wheels in the above described manner. This mechanism will now be described.

Figure 9:
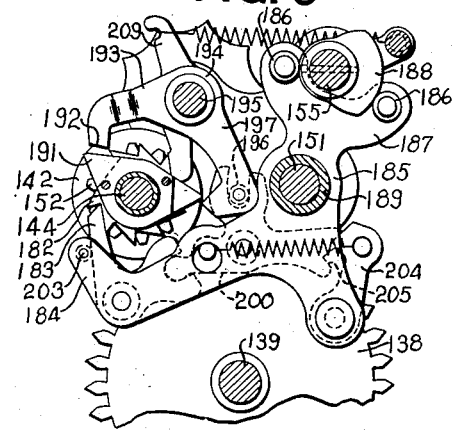
Fig. 9 is a detail view of the upper totalizer showing the transfer mechanism in normal position.
Figure 12:
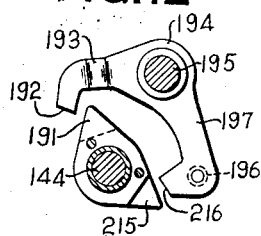
Fig. 12 is a detail view of the device for restoring the transfer pawl to normal when it is tripped by overthrowing the totalizer.

This restoring mechanism includes a restoring tooth 215 (Fig. 12) integral with the tripping tooth 191. This tooth 215 is adapted to cooperate with a nose 216 on the arm 197 of the lever 194. The tooth 215 normally occupies the position in which it is shown in Fig. 9. If, however, the totalizer wheel is overthrown so that the tooth 191 strikes the nose 192 and rocks the lever 194 clockwise, the tooth 215 moves beyond the nose 216 to approximately the position in which it is shown in Fig. 12. At this time the aliner 145 (Fig. 3) is moved into engagement with the proper tooth space on the actuator 138, and if the said actuator has been overthrown, the aliner moves the actuator backwardly or clockwise to its proper position, thus rotating the totalizer gear 152 and the totalizer wheel 142 backwardly or counter-clockwise to its normal position. When this occurs the tooth 215 wipes by the nose 216 and rocks the lever 194 counter-clockwise to its normal position.

If the transfer is authentic, that is, not caused by an overthrow, the tooth 191, together with the ratchet 182 and the totalizer wheel 142 are moved one full step, in which case the aliner 145 is reengaged with the proper tooth space and the totalizer wheel is not rotated backwardly since the retaining pawl 209 moves into the next succeeding notch. It will be noted that the nose 192 on the arm 193 is offset from the arm 197 and that likewise the tooth 191 which is in line with the nose 192 is offset from the tooth 215, which is in the same plane with the nose 216. Thus it can be seen that during the normal rotation of the totalizer wheel the tooth 191 cooperates only with its nose 192, and the tooth 215 cooperates only with its nose 216.

Figure 13:
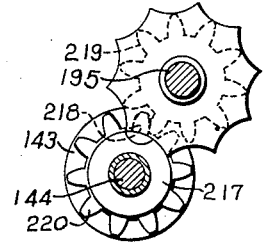
Fig. 13 is a detail view of the Geneva transfer mechanism for the overflow totalizer wheels of the upper totalizer.
Figure 14:
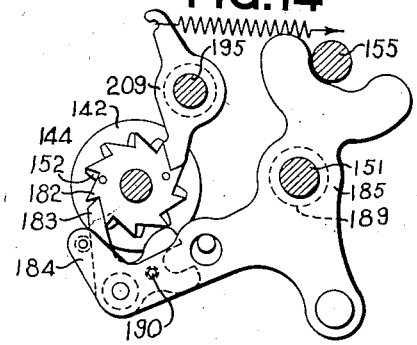
Fig. 14 is a detail view of the transfer arm associated with the ½¢ totalizer wheel.

The usual Geneva transfer mechanism, disclosed in Fig. 13, is provided to transfer or carry into the overflow totalizer wheels 143 (Fig. 15). This transfer mechanism includes the usual disk 217 carrying a single tooth 218 adapted to cooperate with a gear 219 on the rod 195. The disk 217 is secured to the totalizer wheel of lower order and when this wheel has completed one rotation and passes from "9" to "0", the tooth 218 cooperates with the gear 219 to advance this gear one step, which gear 219 also meshes with a gear 220 on the next higher order totalizer wheel, thus advancing the latter wheel one step of movement.

*Sub-totalizing mechanism*

The lower or postage control totalizer, and the upper reading totalizer always stand at the same amount. The reason for this is that neither of these totalizers may be reset to zero. The operator or postal authorities may at any time glance at the sight opening above the keyboard and read therefrom the amount of postage issued by the machine. However, it is impossible to print the amount standing on the totalizer from the upper totalizer, but it is at times desirable to print the total standing on the lower totalizer. The conditioning lever 42 (Figs. 1 and 22) is provided to position the machine to take the total from the lower totalizer, set this total on the type wheels and restore the total to the lower totalizer. This total is then printed on the audit strip and on an inserted slip or government form. The mechanism for controlling the machine to read the lower totalizer and to print the total taken therefrom will now be described.

The control of the machine to add or to read resides in the control lever 42. This lever is pivoted on the rock shaft 65 (see Fig. 22) and carries a stud 213 projecting through a slot 214 in the totalizer engaging control lever 133, previously mentioned. As long as the lever 42 remains in its add position, in which it is shown in Figs. 1 and 22, the lever 133 is held in the position shown in Fig. 22, in which position the slot in the end thereof, embracing the stud 132 of the link 128, holds this link in the adding position with the stud 127 thereon resting in the slot 130 in the adding-engaging lever 126. When the lever 42 is rocked clockwise to its "read" position, the stud 213 on the lever 42, acting in the slot 214 rocks the lever 133 clockwise, which through the stud 132 rocks the link 128 also clockwise to remove the stud 127 from the notch 130 in the arm 126 and to position the stud 127 in a slot 221 in an ear 239 carried on the upper end of a "read" engaging lever 222 pivoted on the shaft 100. A roller 223 on the lever 222 projects into the cam grove 224 in a cam 225 secured to the drive shaft 80.

The timing of the cam 225 is such that it rocks the totalizer into engagement with the adding segments 68 before these segments are permitted to advance by the universal rod 75, and maintains the totalizer in engagement with the adding segments until after said segments have been restored to their normal positions.

The cam 225 and the lever 222 (Fig. 23) also operate the aliner 145 (Fig. 16) described above, for the upper totalizer actuators 138. A projection 235 bent at right angles to the lower end of a link 236 is pivotally connected to the lever 222. The link 236 lies flat against the back frame 32 and is suitably supported to slide vertically thereon. Near its upper end the link 236 is offset, and the offset portion is recessed to receive the rounded end of an arm 237 secured to the shaft 145.

Obviously, clockwise movement of the lever 222 under the influence of the cam 225, to engage the lower totalizer with the actuators, lowers the link 236 and rocks the arm 237, the shaft 148 and the arms 147 clockwise to disengage the aliner 145 from the actuators 138.

When the movement of the lever 222 is reversed to disengage the lower totalizer, the link 236 is thrust upwardly to reengage the aliner 145 with the actuators 138.

Movement of the control lever 42 also operates mechanism to render the zero stop arms 61 ineffective so that when the adding segments 68 are advanced the totalizer wheels 112 are rotated backwardly until the tripping tooth thereon strikes the end of the pawl 120, thus arresting the movement of the totalizer wheels and of the adding segments 68 in positions corresponding to the amount which stood on the totalizer wheels. The universal rod 75 is then rocked counter-clockwise, carrying the adding segments 68, and therewith, the setting segments 90 to normal positions, setting the amount taken from the totalizer on the type wheels, as will hereinafter be described.

The mechanism for rendering the zero stop arms 61 ineffective by movement of the control lever 42 to its "read" position will now be described. Referring to Fig. 18, when the lever 42 is rocked clockwise to its "read" position, a stud 226 on the lever 42 wipes along the end of the curved arm 227 secured to a shaft 228 journaled in the machine side frames 30 and 31. Mounted on the shaft 228 and secured thereto is a series of arms 229 (Fig. 3) each carrying a stud 230 projecting across the path of and adapted to cooperate with the zero stop arms 61.

Counter-clockwise movement of the shaft 228 carries the arms 229 therewith, and the studs 230 coming into contact with the zero stop arms 61, rock these arms clockwise against the tension of the springs 63 to remove the ends of said arms from above the projections 66 of the adding segments 68, thus freeing these segments for advancement under the influence of their springs 71. At the same time the counter-clockwise movement of the arms 229 positions the ears 231 thereon beneath projections 232, carried by the detent bars 54, thus blocking movement of these bars and effectually locking all of the keys against depression.

It was stated above that movement of the control lever 42 from its "add" position to its "read" position rocks the shaft 177 clockwise, (Fig. 16), and through the arm 176, bell crank 168, and link 166, rocks the upper totalizer engaging pitman 164 clockwise to disengage it from the stud 163, thereby disabling the upper totalizer engaging drive mechanism. The mechanism whereby movement of the control lever 42 rocks the shaft 177 to accomplish this disabling effect will now be described.

Referring to Fig. 19, it will be noted that a roller 233, carried on an arm 234 of a lever 240 secured to the shaft 177 rests opposite a face 241 on the control lever 42. When the control lever 42 is moved from its "add" position to its "read" position the face 241 comes into contact with the roller 233 and rocks the lever 240, shaft 177, and consequently the arm 176, clockwise, thus, as above described, rocking the bell crank 168 also clockwise to uncouple the upper totalizer engaging mechanism from its drive.

Movement of the control lever 42 clockwise from its "add" position (see Fig. 19) to its "read" position, also locks the repeat key 41 against depression. An arm 242 (Figs. 19 and 20) secured to the shaft 177 has a slot 243 in the end thereof adapted to receive a flattened stud 244 on an arm 245 of the repeat lever 107 when the repeat key is operated. One prong of the arm 242 terminates in a tail 246 which, when the control lever 42 is rocked clockwise, rocking the lever 240 (Fig. 19), shaft 177, and the arm 242 clockwise, is positioned beneath the stud 244, thereby locking the repeat key against operation.

However, when the repeat key 41 is operated for a repeat operation, the stud 244 enters the slot 243 and rocks the arm 242 counter-clockwise. This movement of the arm 242 tensions a spring 248 coiled about the shaft and having its ends bent upwardly to embrace a stud 249 on the arm 242 and a stud 250 on the left side frame 31. Near the end of the operation, the repeat key arm 245 is rocked clockwise to normal by a spring 247. As this occurs the stud 244 is raised and rocks the arm 242 clockwise, assisted by the previously tensioned spring 249. When the stud 244 leaves the slot 243, the spring 249 continues to move the arm 242 clockwise until the latter reaches its normal position. Such clockwise movement of the arm 242 also carries the shaft 177 and lever 240 to their normal positions.

Movement of the control lever 42 from its "add" position to its "read" position also sets the type wheels in the printing mechanism to print a character indicating that a "read" operation has been made. A link 251 (Fig. 22) connects an arm 252 projecting rearwardly from the lever 42 with an arm 253 secured to the outermost one of the tubes 136. This tube extends into the printing mechanism where it controls the setting of the type wheel in a manner to be described later, in connection with the description of the printing mechanism.

Movement of the control lever 42 from its "read" position to its "add" position rocks the lever 133 (Fig. 22) counter-clockwise to normal position, removing the stud 127 on the end of the link 128 from the slot 221 in the ear 239 of the arm 222 and into cooperative relation with the ear 131 on the adding engaging lever 126. Restoration of the control lever 42 to its "add" position also restores the shaft 177 counter-clockwise to its normal position. The other arm 254 of the lever 240 (Fig. 19) has an arcuate surface 255 adapted to cooperate with a stud 256 projecting from the lever 42. By reference to Fig. 19 it can be seen that counter-clockwise movement of the lever 42 to its "add" position, due to the stud 256 cooperating with the surface 255, cams the lever 240 counter-clockwise to normal. This, of course, rocks the shaft 177 and the arm 176 also counter-clockwise, whereupon the stud 175 cams the bell crank 168 also in a counter-clockwise direction, which movement, by the link 166, rocks the pitman 164 (Fig. 16) counter-clockwise about its pivot stud 165, disengaging the slot 180 from the stud 181, and coupling the pitman 164 to the stud 163 on the three-armed lever 160.

The zero stop pawls 61 are also restored to their normal positions upon movement of the control lever 42 to its normal position. As the lever 42 is rocked counter-clockwise to its "add" position, the stud 226 on the arm 241 thereof frees the arm 227, whereupon the springs 63 for the zero stop arms 61 rock these arms counter-clockwise to normal, rocking the shaft 228 clockwise to its normal position. This also frees the amount, weight and zone keys for depression, since the arms 229, on their restoring movement, carry the ears 231 thereon from beneath the projections 232 on the detent bars 54 thereby releasing these bars for operation.

Repeat mechanism

It frequently happens in mail order houses, or other concerns, that a great number of packages are to be shipped by parcel post, said parcels being of the same weight, having the same zone as their destination and require the same amount of postage. When such a number of packages are to be despatched a great saving of time can be effected by enabling the operator to set up the keys to enter the data relative to the first of such parcels and then, by merely depressing a repeat key, to enter the same data for each of the remaining parcels. The repeat mechanism disclosed in the present machine is of the type disclosed in application for Letters Patent of the United States, Serial No. 169,583, filed February 19, 1927, by William H. Robertson.

When using this repeat mechanism it is unnecessary that the operator have foreknowledge that a repeat operation is to be made; he merely depresses the repeat key, whereupon the machine operates to register and enter exactly the same amount and information as that of the last operation.

Depression of the repeat key 41 (Fig. 20) locks all of the zone, weight and amount keys against depression, and locks the control lever 42 against movement, it being unnecessary to press any key other than the repeat key to make a repeat operation. The repeat key, when depressed, also disables the key releasing mechanism, which, if actuated on repeat operations, would result in damage to the machine.

The repeat key lever also trips the machine releasing mechanism to release the machine for operation independently of the regular machine release bar 43, therefore making it necessary to press only the repeat key to effect a repeat operation.

It will be remembered that the setting segments 90 of the amount, weight and zone banks remain where last adjusted at the end of an operation.

It will also be remembered that the broad coupling pinions 86 normally are in mesh with the respective actuating segments 68 and their associated setting segments 90, and upon the beginning of an adding operation are first disengaged from said segments to allow the actuating segments 68 to be positioned under control of such keys as have been depressed, and the setting segments restored to their zero positions. The coupling pinions 86 are then restored to connect the associated segments 68 and 90 so that the segments 90 may set the type carriers, under control of the segments 68, to represent the indicia corresponding with the keys last depressed.

In order to accomplish a repeat operation, all that is necessary is to place the segments 68, which, at the end of an operation, occupy their home positions, under the control of the setting segments 90, which, at the end of an operation lie in the positions to which they were adjusted during the last operation.

This is accomplished by disabling the coupling pinion operating mechanism thereby allowing the coupling pinions 86 to remain in mesh with their associated segments 68 and 90.

It will be remembered that the upper end of the link 101 (Fig. 20) is recessed to embrace the stud 108 projecting from the arm 103 on the shaft 89. Also, it will be remembered that the stud 104 projecting laterally from the upper end of the link 101 is embraced by the slot 105 in the arm 106 of the repeat key lever 107.

Depression of the key 41 rocks the lever 107 counter-clockwise whereby the slot 105, carrying the stud 104 therewith, rocks the link 101 clockwise about its pivot on the end of the arm 102, thus disengaging the recess in said link from the stud 108. At the same time a slot 257 in the arm 106 embraces the stud 108 in the arm 103, thus holding the pinions 86 in mesh with their respective actuating segments 68 and setting segments 90.

To prevent depression of the amount, weight and zone keys on repeat operations, the forwardly extending arm 245 of the repeat key lever 107 (Fig. 20) carries a stud 258 normally in line with the open end of a cam slot 259 formed in one arm 265 of an elbow lever 266 fast on the shaft 228. One prong of the arm 265 is extended to form a finger normally resting against the left-hand side of the stud 258, thus limiting the clockwise rotation of the lever 266 and of the shaft 228.

The shape of the cam slot 259 is such that, as the stud 258 travels downwardly therein upon depression of the repeat key 41, the stud rocks the elbow lever 266 counter-clockwise, and consequently rocks the shaft 228 in the same direction.

It will be remembered that the arms 229 (Figs. 3 and 18) also are fast on the shaft 228, consequently upon counter-clockwise rotation of this shaft, the arms 229 are carried counter-clockwise to position the ears 231 thereon beneath the projections 232 on the detent bars 54. This prevents depression of a key after the repeat key 41 has been depressed. Also, the studs 230 on the arms 229, upon depression of the repeat key, engage their respective zero stop arms 61 and rock them to their ineffective positions. This permits the adding segments 68 to be set under the control of the setting segments 90.

It was described above how operation of the control lever 42 rocks the shaft 228 counter-clockwise for the purpose of removing the zero stop arms 61 to their ineffective positions. This movement of the shaft 228 carries the right-hand prong of the arm 265 (Fig. 20), which prong is flattened at its end, beneath the stud 258, thus locking the release key lever against operation when the control lever 42 is set to "read" position.

Depression of the repeat key 41 also disconnects the key release device from its operating mechanism. This is accomplished in the following described manner.

When the repeat key 41 is depressed, rocking the lever 107 counter-clockwise, the stud 258, it will be recalled, enters the slot 259 in the arm 265 and rocks the lever 266 counter-clockwise. At this movement of the lever 266 the arm 267 thereof lowers the link 117, connecting the arm 267 with the pitman 74, thus lowering the left-hand end of the pitman and disengaging the recess therein from a stud 73 on the lever 72. Now, when the cam 99 thrusts the pitman 74 toward the left, as described above, the pitman moves idly under the stud 73, permitting the key release mechanism, including the arm 70, shaft 47, and the fingers 46 (see Fig. 3) to remain at rest.

Near the end of the operation the cam 99 permits the spring 97 to draw the pitman 74 toward the right to its normal position, and the restoration of the repeat key by its spring 47 rocks the lever 266 and shaft 228 clockwise, raising the link 117, thus rocking the pitman 74 clockwise, engaging the recess therein with the stud 73.

When the repeat key is released and restored to normal position by the spring 247, the slot 105 in the arm 106 of said lever reengages the recess in the link 101 with a stud 108 on the arm 103, and withdraws the open slot 257 in the arm 106 from its cooperative relation with the stud 108, thus coupling the pinion shaft 89 with its drive mechanism.

*Releasing mechanism*

The mechanism for releasing the machine for operation provided in the present machine is substantially the same as that provided in the machine of the before-mentioned patent.

The machine is normally restrained in its home or normal position by a clutch arm 270 (Fig. 22) under the control of the starting bar or release bar 43 (Figs. 1 and 22). A hub 271 of the clutch arm 270 is journaled on a rod 272 (see also Fig. 15), pivotally supported in a pair of ears 273, projecting outwardly from the right side frame 30 of the machine. The bifurcated end of an arm 274, also pivoted on the rod 272 and clutched to the hub 271 of the arm 270, embraces a stud 275 carried on a projection 276 bent at right angles to a vertically disposed link 277 slidably mounted on studs 278 and 279 (Fig. 22) projecting inwardly from the right side frame 30 of the machine.

An ear 280 (Fig. 22) bent at right angles to the upper end of the link 277 rests on the shoulder of an arm 281 pivoted on the stud 278 and normally prevents downward movement of the link 277, thus normally preventing counter-clockwise movement of the arm 274, as viewed in Fig. 15, and of the clutch arm 270. This maintains a toe 282 on the clutch arm in the path of a shoulder on a clutch release disk 283, a fragment of which appears in Fig. 15, journaled on a short shaft 284, suitably supported in the machine. The clutch control disk 283, when held in its normal position by the toe 282 of the clutch arm 270, maintains the driving motor (not shown) disconnected from a gear 285 rotatably mounted on the shaft 284.

After the desired amount keys, weight keys and zone keys have been depressed, the machine is released for operation by depressing the motor release bar 43 (Fig. 22), the stem of which bar is removably supported on two studs 286 carried on a slide 287 mounted on studs 288 and 289 projecting inwardly from the right side frame 30 of the machine.

When the motor release bar 43 is operated, a stud 295 carried thereby rocks the arm 281 clockwise (Fig. 22) and removes the shoulder thereon from beneath the ear 280 of the link 277, whereupon a spring 296 (Fig. 15), one end of which is connected to an arm 297 secured to the hub 271 of the clutch arm 270, rocks the arm 297, the clutch arm 270 and the arm 274 counter-clockwise to remove the toe 282 of the clutch arm from the path of the shoulder (not shown) of the clutch control disk 283. When this occurs, mechanism not shown herein, but which is fully disclosed in the above mentioned William H. Robertson Patent No. 1,816,263, connects the drive motor with the gear 285, the motor rotating this gear in a counter-clockwise direction. The gear 285 meshes with a gear 298 rotatably mounted on a stud 299 suitably supported in the machine, the gear 298 having secured to the side thereof a gear 300 meshing with a gear 301 rotatably mounted on a stud 302. The gear 301 is broken away to show a spiral gear 303 also journaled on the stud 302 and connected to the gear 301 by a sleeve 304. The spiral gear 303 meshes with a spiral gear 305 secured to the drive shaft 80. The ratio of the train of gears just described is such that one rotation in a counter-clockwise direction (Fig. 15) imparted to the gear 301 and to the spiral gear 303 imparts one rotation in a counter-clockwise direction as viewed in Fig. 3, to the spiral gear 305 and to the drive shaft 80 at each operation of the machine.

Near the end of the operation of the machine, a stud 306 projecting laterally from the gear 301 (Fig. 15) engages the beveled portion of a block 307 secured to the arm 297 and cams this arm clockwise, which movement of said arm through its connection with the hub 271 of the clutch arm 270, rocks the clutch arm clockwise to reposition the toe 282 thereof in the path of a shoulder (not shown) on the clutch control disk 283, a fragment of which is shown in Fig. 15, so that as this disk approaches its normal position, the shoulder (not shown) strikes the toe 283 of the clutch arm, thereby disconnecting the motor from the train of drive gears just described, and bringing the machine to rest in its home position.

The clockwise movement of the hub 271 of the clutch arm 270, under control of the stud 306, likewise rocks the arm 274 (Fig. 15) clockwise, which, through the stud 275, raises the link 277 to position the ear 280 thereon above the shoulder on the arm 281, whereupon a spring 294 (Fig. 22) rocks the arm 281 counter-clockwise to position the shoulder thereon beneath the ear 280, thereby restraining the releasing mechanism in its normal position. At the same time the spring 294 rocks the arm 281 counter-clockwise, and through the engagement of this arm with the stud 295, restores the slide 287, and thereby the release bar 43, to their normal positions.

*Key lock mechanism*

The link 277 when it moves downwardly to release the machine, operates mechanism to raise the locking bars 58 (Fig. 3) to lock the keys against manipulation either in their depressed or their undepressed positions. This mechanism includes a bail 308 (Figs. 3, 15, 19, 20 and 22), carried by a pair of arms 309 (Figs. 3, 15, 18 and 20) and 310 (Fig. 22) journaled on the shaft 228. An arm 311 (Fig. 22) connected by a yoke 312 to the arm 310 is bifurcated to embrace a stud 313 projecting from the link 277. When the link 277 moves downwardly, as above described, to release the machine, the stud 313 rocks the arm 311 and the arms 309 and 310 clockwise, carrying the bail 308 therewith. On its clockwise movement the bail 308 (Fig. 3) picks up the slotted arms 67 (Fig. 3), rocking said arms counter-clockwise to raise the locking bars 58 to position the hooked projections thereon over the key pins 52 of the depressed keys and under the key pins 52 of the undepressed keys, thereby preventing manipulation of the keys during the operation of the machine.

When, near the end of the operation the link 277 is raised by the stud 306 (Fig. 15) on the gear 301 striking the block 307, the stud 313 (Fig. 22) on the link 277 rocks the arm 311, yoke 312, the arms 309 and 310, and the bail 308 counter-clockwise, withdrawing the bail from contact with the arms 67 to permit the mechanism described above to lower the slotted arms 67 thereby releasing the keys to the action of their springs 51, which springs immediately restore the depressed keys to their undepressed positions.

It is also desirable to lock the repeat key 41 against operation when the machine is released for operation. This is accomplished by an arm 314 (Figs. 19 and 20) secured to the arm 309. When the machine is released for operation and the bail 308 rocks clockwise, as viewed in Fig. 19, it carries the arm 314 therewith positioning the end of this arm beneath the stud 258 on the repeat key arm 245, thus blocking depression of the repeat key 41.

On repeat operations the repeat key is locked in its depressed position by the arm 314 in the following described manner:

When the repeat key is fully depressed and the machine is released for operation, rocking the bail 308 and arm 314 clockwise, as viewed in Fig. 20, a recess 315 in the right-hand wall of the arm 314 embraces the stud 258 thereby preventing release of the key 41 until the bail 308 and arm 314 are restored counter-clockwise near the end of the operation, by the upward movement of the link 277 (Fig. 22).

Mechanism is provided whereby the repeat key, as it nears the lowermost limit of its releasing movement, operates mechanism to release the machine for operation. This mechanism includes the arm 242 (Fig. 20) and the stud 244 on the arm 245 of the repeat key lever 107. It will be remembered that the stud 244, as it is carried downwardly upon operation of the repeat key, enters the slot 243 in the arm 242 rocking this arm and the shaft 177 counter-clockwise. This movement of the shaft 177 also carries the lever 240 (Fig. 22) counter-clockwise therewith. A stud 316 on the arm 254 of the lever 240, upon counter-clockwise movement of this lever, comes into contact with the right-hand wall of a projection 317 on the arm 281, rocking this arm clockwise to remove the shoulder thereon from beneath the ear 280 on the link 277, thereby permitting downward movement of this link to release the machine for operation in the above described manner. This device makes it unnecessary to depress the motor release bar 43 in addition to the repeat key when operating the machine to make repeat operations.

Mechanism is operated by the key lock mechanism to lock the control lever 42 against manipulation after the machine is released for operation. An arm 318 integral with the arm 310 (Fig. 22) and projecting upwardly therefrom carries a stud 319 adapted, when the link 277 is lowered to release the machine, rocking the arms 311 and 310 and the bail 308 clockwise, to enter one of two notches in a plate 325 secured to the control lever 42, thus locking this lever in one of its two positions, depending upon the position in which it is set. Restoration of the releasing mechanism at the end of the operation removes the stud 319 from the particular notch into which it was moved when the machine was released, thereby freeing the control lever 42 for adjustment.

*Mechanism to lock the machine when the postage issuing totalizer exceeds its predetermined capacity*

It was set forth above that the lower, or postage control totalizer is set by the postal authorities to issue a predetermined amount of postage and, when this amount is exhausted, mechanism is operated to lock the machine against further operation. This locking mechanism includes a restraining lever 327 (Fig. 8), pivoted on a stud 328 projecting laterally from a bracket 329 (Figs. 7 and 8) secured to the crossbar 33. When the totalizer exceeds its predetermined, set capacity, the lever 327 is rocked counter-clockwise carrying an arm 330 thereof into the path of the bail 308. Referring to Fig. 22, it can be seen that if the bail 308 is held against clockwise movement, the arm 310, the yoke 312, and arm 311 also are held against clockwise movement, thus restraining the link 277 in its uppermost position and thereby preventing releasing movement of this link. This holds the clutch arm 270 in cooperative relation with the clutch control disk 283 (Fig. 15) and the machine may not be operated until the arm 327 (Fig. 8) is rocked clockwise to free the bail 308.

The mechanism for raising the arm 330 into the path of the bail 308 when the totalizer exceeds its predetermined capacity will first be described.

A stud 331 projects laterally from the arm 330 through an angular open slot 332 in an operating lever 333 pivotally supported on a stud 334 projecting from the lower end of the bracket 329. A nose 335 on the operating lever 333 normally abuts against the left-hand edge (as viewed in Fig. 8) of a finger 336 pivotally carried on the arm 122 of highest denominational order. The finger 336 normally rests against a stud 337 projecting from the arm 122, which stud prevents clockwise movement of the finger from the position in which it appears in Fig. 8. The end of the finger 336 normally rests in the path of a tappet 338 carried on a disk 339 rotatably mounted on the rod 113 and rigidly connected to the totalizer wheel 112 of highest order by a sleeve 340 (see Fig. 15).

When the totalizer wheel of highest order rotates from "zero" to "one" the tappet 338 cams the finger 336 counter-clockwise and, since the finger 336 normally abuts against the operating lever 333, it rocks this lever also counter-clockwise, camming the stud 331 and thereby the lever 327 counter-clockwise to position the end of the arm 330 in the path of the bail 308.

The lever 327 is alined either in its ineffective position, in which position it appears in Fig. 8, or in its moved position. A yoke 341 (Fig. 8) connects the lever 327 with an arm 342, which arm has a finger 343 projecting downwardly therefrom, carrying a stud 344. The nose of an alining pawl 345 pivotally supported by a bracket 346 secured to the crossbar 33, is pressed against the stud 344 by a spring 347. When the lever 327 is rocked counter-clockwise to its locking position, as above described, the stud 344 wipes by the nose of the pawl 345, tensioning the spring 347, which immediately moves the nose upwardly against the stud 344 to hold the lever 327 in its moved position.

Before the machine may be further operated to issue additional postage, it is necessary for the mailer to take the machine to the postal authority, who has in his possession the key to the lock which controls the locking lever 327. A lock bolt 348 projecting upwardly from a lock 349 secured to the bracket 329 cooperates with a tail 355 projecting forwardly from the lever 327. When a duly authorized person operates the lock 349 the bolt 348 is shifted vertically upwardly, rocking the lever 327 clockwise, lowering the arm 330 out of the path of the bail 308, which action cams the operating lever 333 clockwise to normal, at the same time rocking the finger 336 also clockwise to interpose the nose thereof in the path of the tappet 338, so that when the disk 339 makes a complete rotation said tappet 338 again comes beneath the finger 336.

The highest denominational order totalizer wheel included in the present machine is the one-hundred dollar wheel. It is obvious, therefore, that each time the wheel 112 of highest order, that is, the hundred dollar wheel, makes a complete rotation, one thousand dollars has been added onto the totalizer. It is also obvious that the tappet 338 (Fig. 8) trips the locking device at each rotation. Therefore, by unlocking the machine the postal authorities merely set the locking device so that when the hundred dollar wheel 112 completes another rotation, or stated otherwise, when one thousand dollars worth of postage has been issued by the machine the totalizer wheel, that is, the hundred dollar totalizer wheel passes from "0" to "1", it again trips the locking device. If another tappet 338 were added to the disk 339 diametrically opposite the tappet 338, it is obvious that the locking device would be tripped at each one-half rotation of the hundred dollar wheel, or at the issuance of each five-hundred dollars worth of postage. Similarly, if a tappet were placed in every other space about the disk 339 the machine would automatically lock at the issuance of each two hundred dollars worth of postage. It is to be understood, therefore, that the amount of postage to be issued before the machine automatically locks against release, may be varied without departing from the spirit of the invention.

The person authorized to unlock the machine is compelled to turn his key backwardly to normal before the machine may be released for operation. To accomplish this result the lock bolt 348 (Fig. 7) controls a second locking lever 356 also pivoted on the stud 328. When the key is inserted in the lock and turned to restore the lever 327 to normal, the lever 356 is rocked clockwise to position the end of an arm 357 thereof in the path of the bail 308. An arm 358 of a lever 356 projects through a slot in the lock bolt 348. The lever 356 remains in this locking position until the key is turned backwardly to normal position, lowering the bolt 348 and rocking the lever 356 counter-clockwise to withdraw the arm 357 from the path of the bail 308. The machine may now be released to issue further postage.

The barrel 359 of the lock 349 projects through the cabinet 34 at the front of the machine (see Fig. 1) where a shouldered collar 360 (Figs. 1 and 8) is adapted to be slipped over the end of the barrel 359. A seal 361 is then adapted to be applied through coinciding holes in the collar 360 and the barrel 359 of the lock to prevent unauthorized removal of the collar 360. Thus, the collar 360 when in place prevents insertion of the key into the lock, and likewise prevents removal of the cabinet from the machine, since the diameter of the collar is greater than the diameter of the opening in the cabinet 360 through which the bolt 359 and the shouldered portion of the collar 360 project.

When the machine is taken to the postal authority for the purpose of unlocking the machine, the authorized person first breaks the seal 361 and inserts the key, turns the key one-fourth turn, rocking the lever 327 (Fig. 8) clockwise, removing the arm 330 from the path of the bail 308, and at the same time rocking the lever 356 (Fig. 7) clockwise to position the arm 357 in the path of the bail 308. He then reverses the movement of the key, rotating it counter-clockwise to normal, which movement rocks the lever 356 counter-clockwise, raising the arm 357 out of the path of the bail 308, the lever 327 being held in its ineffective position (see Fig. 8) by the pawl 345. The collar 360 is then replaced on the barrel 359 and the seal affixed.

Printing mechanism

The printing mechanism disclosed in the present case is substantially the same as that disclosed in Letters Patent of the United States, No. 1,929,652, issued on October 10, 1933 to William H. Robertson. A view in right elevation of this printing mechanism appears in Fig. 26. A brief description of this mechanism will now be given.

Type wheels

Figure 28:
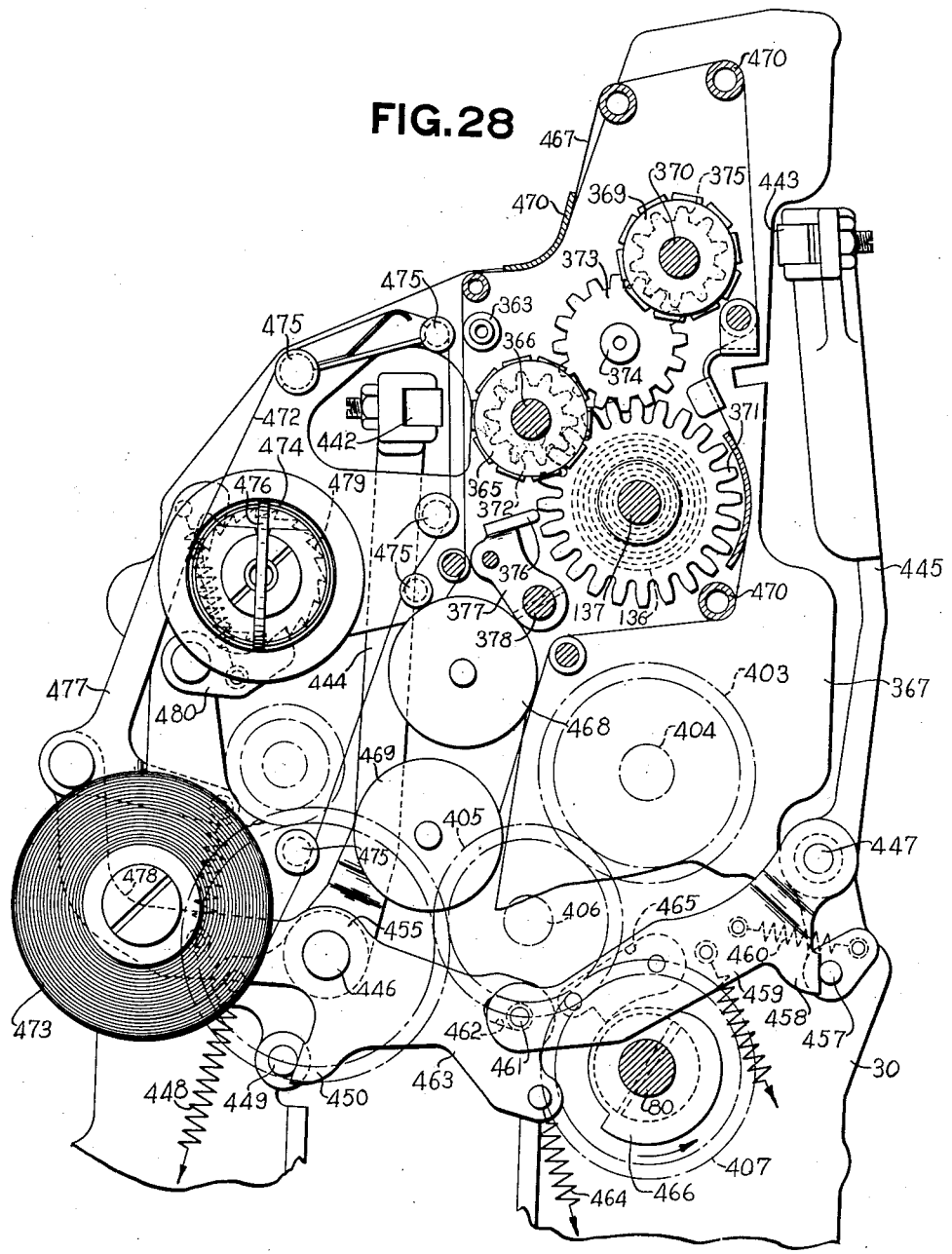
Fig. 28 is a detail view of the printing mechanism.

It was mentioned above that the type wheels are set differentially by the differential mechanism for the amount, weight and zone banks of keys and by movement of the control lever 42. The movements of these elements are transmitted through the nested tubes 136 to the printing mechanism (Fig. 28). The type wheels are mounted in two groups, one group comprising type wheels 365 to print on the detail strip and on an inserted slip, and the other group comprising type wheels 369 to print on the issuing postage label. The first group of type wheels 365 (Fig. 28) are mounted on a shaft 366 supported by a right-hand printer frame 364 (Fig. 26) and a left-hand printer frame 367. The frame 367 is suitably supported by and spaced apart from the right side frame 30. The frame 364 is suitably supported by screws 362 and studs 363 and 374, which studs project from the printer frame 367. The group of type wheels 369 adapted to print on the issuing postage label are mounted on a shaft 370 supported by the frames 364 and 367.

Both the group of type wheels 365 and the group of type wheels 369 are rotated differentially simultaneously in the following described manner:

Large gears 371 (Fig. 28), one mounted on the printer end of each of the tubes 136, mesh with gears 372, one secured to the side of each of the type wheels 365 on the stud 366, thus setting directly the type wheels of this group. The gears 371 also mesh with intermediate gears 373 mounted on the stud 374, which gears 373 mesh with gears 375, one secured to each of the type wheels 369 of the issuing postage label group of type wheels. Thus it can be seen that the differential setting of the setting segments 90 (Fig. 3) and the intermediate gears 135 is transmitted through the tubes 136 and the shaft 137 to the gears 371, which in turn differentially position the type wheels according to the set-up on the keyboard of the machine.

Type wheel aliner

Figure 29:
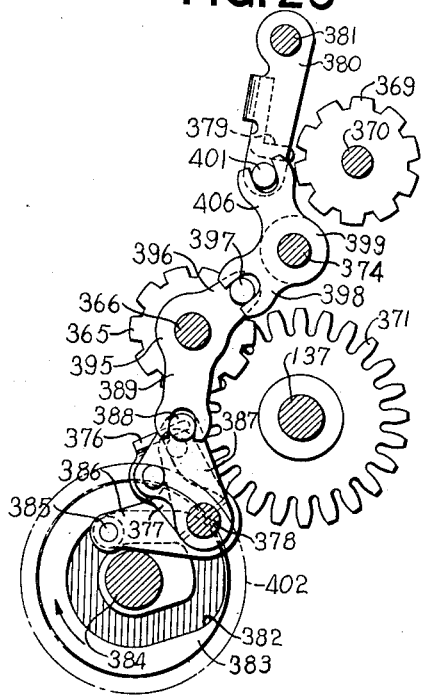
Fig. 29 is a detail view of the type wheel aliner operating mechanism.

After the groups of type wheels 365 and 369 are set as above described, and before the printing platens are operated to take impressions therefrom, mechanism is operated to aline them in their set positions. This mechanism includes an aliner bar 376 (Figs. 28 and 29) carried by an arm 377 secured to a shaft 378 supported by the printer frames 364 and 367. This aliner cooperates with the inter-tooth spaces on the gears 371 to aline these gears and consequently the type wheels 365 in their adjusted positions. Due to the lost motion between the gears 371, 373 and 375, additional means is provided to aline the upper group of type wheels 369. The mechanism for alining the group of type wheels 369 includes an aliner 379 (Fig. 29), carried by an arm 380 pivotally supported on a stud 381 projecting from the printer frame 367.

Suitable mechanism is provided to operate simultaneously both the aliner 376 and the aliner 379. This mechanism includes a cam groove 382 in a cam 383 rotatably mounted on a stud 384 projecting from the right side frame 30 of the machine. A roller 385 carried on an arm 386 secured to the shaft 378 projects into the cam groove 382. Also secured to this shaft is the supporting arm 377 for the aliner 376, and an arm 387 (Fig. 29) carrying at its free end a stud 388 embraced by the bifurcated end of an arm 389 of a lever 395 pivotally supported on the type wheel shaft 366. The other arm 396 of the lever 395 carries a stud 397 embraced by a bifurcated arm 398 of a lever 399 pivotally supported on the stud 374, the other arm 406 of which lever 399 is bifurcated to embrace a stud 401 projecting from the arm 380 of the upper type wheel aliner.

The configuration of the cam groove 382 is such that at the proper time it rocks the arm 386, shaft 378 and the arms 377 and 387 clockwise. This carries the aliner 376 into engagement with the inter-toothed spaces on the gears 371 to aline the type wheels 365. Also, the arm 387 through the stud 388 rocks the lever 395 counter-clockwise, which through the stud 397 rocks the lever 399 clockwise, and this lever through the stud 401 rocks the liner arm 380 counter-clockwise carrying the aliner 379 into the spacing between the types on the type wheels 369 thereby alining these type wheels. After the impressions are made, and at the proper time, the cam groove 382 rocks the shaft 378 counter-clockwise, removing the aliner 376, rocking the lever 395 clockwise, the lever 399 counter-clockwise, to remove the aliner 379 from engagement with the type wheels 369.

Figure 31:
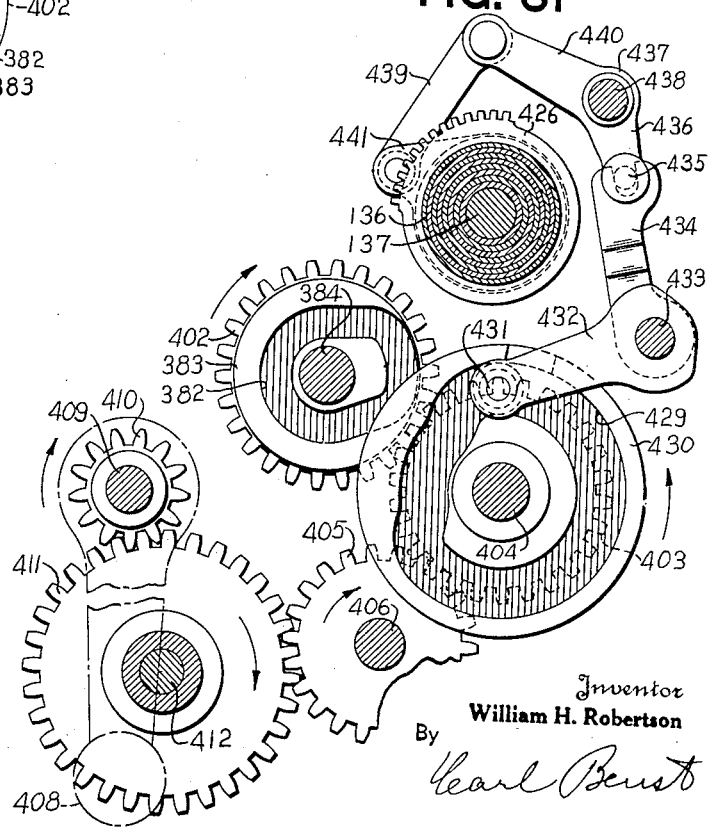
Fig. 31 is a detail view of the consecutive number operating mechanism.

The cam 383 is driven from the drive shaft 80 by the following described train of gears. A gear 402 (Figs. 29 and 31) secured to the side of the cam 383 meshes with a gear 403 journaled on a stud shaft 404 suitably supported in the machine. The gear 403 in turn meshes with a gear 405 rotatably mounted on a stud 406 mounted on the frame 30. The intermediate gear 405 meshes with a gear 407 (Fig. 28) secured to the drive shaft 80 (see Fig. 28). The ratios of these gears is such that one rotation in a counter-clockwise direction of the gear 407 imparts one rotation in the same direction to the gear 403 and one rotation in a clockwise direction to the gear 402 at each operation of the machine.

In case of failure of the electric current, the machine, as is usual in this type of machine, may be operated by a crank 408, shown in dot and dash lines (see Fig. 31), this crank is rotatably mounted on a stud 409 projecting from the right side frame 30 of the machine, and is rigidly connected with a gear 410 also rotatably mounted on the stud 409. The gear 410 meshes with a large idler gear 411 rotatably mounted on a stud 412, which gear 411 also meshes with the intermediate gear 405. The ratio of this train of gears is such that it requires two clockwise rotations of the crank 408 and the gear 410 to impart one rotation to the gears 403 and 402, and to the main drive shaft 80.

*Consecutive number type wheels*

Figure 30:
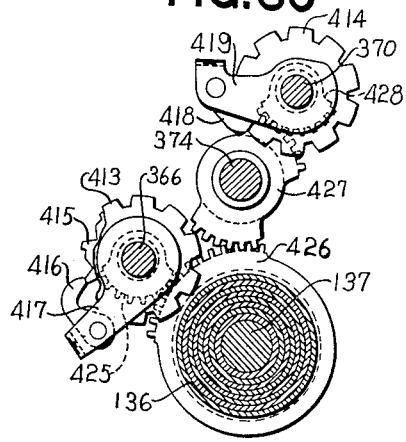
Fig. 30 is a detail view of the consecutive number mechanism.

The machine is provided with groups of type wheels known in the art as "consecutive number" type wheels, to print the serial or consecutive number of the postage labels issued by the machine. These type wheels are adapted to be advanced one step at each adding operation of the machine. The consecutive numbering mechanism is not actuated during total taking operations because when the total lever is moved into its total taking position it sets a device which uncouples the consecutive number actuating mechanism in the same way as shown in Fig. 8 of the United States Patent No. 1,795,509 or as shown and described in the copending application, Serial No. 479,938, Fig. 25. The type of coupling mechanism is old and well known in the art and a detailed description is therefore not given here. These groups of consecutive number type wheels include the type wheels 413 (Fig. 30) on the type wheel shaft 366, and type wheels 414 mounted on the type wheel shaft 370. To the side of each of the gears 413 is secured a ratchet 415 with which is adapted to cooperate a tined pawl 416 carried between a pair of yoke arms 417 rotatably mounted on the shaft 366. Likewise a tined pawl 418 carried between a pair of yoke arms 419 rotatably mounted on the shaft 370 is adapted to cooperate with ratchets (not shown) secured to the sides of the type wheels 414.

In order to operate the yoke arms 417 and 419 to advance the consecutive number type wheels a segment 425 is secured to one of the arms 417. This segment 425 meshes with a segmental gear 426 pivoted on the outer tube 136, which gear 426 meshes with a segment lever 427 which in turn meshes with a segment 428 secured to the side of one of the arms 419. At the proper time the segment 426 (Fig. 30) is rocked clockwise and then counter-clockwise to normal, rocking the segment 425 and consequently the arm 417 first counter-clockwise to retract the pawl 416, and then clockwise to advance the consecutive number type wheel of lowest order one step of movement. At the same time the clockwise movement of the segment 426 rocks the lever 427 counter-clockwise to rock the segment 428 clockwise to retract the pawl 418. The segment 426 on its counter-clockwise movement rocks the lever 427 clockwise and the segment 428 and arm 419 counter-clockwise to advance the type wheel 414 of lowest order one step of movement.

The means for operating the segment gear 426 will now be described. This mechanism includes a cam groove 429 (Fig. 31) in the side of a cam 430 mounted on the shaft 404 and connected to the side of the gear 403 by a coupling mechanism, similar to that shown and described in Fig. 8 of the United States Letters Patent No. 1,795,509. The cam groove 429 embraces a stud 431 carried on an arm 432 pivotally supported on a stud 433 projecting from the side frame 30 of the machine. The arm 432 is secured to an arm 434 having its end bifurcated to embrace a stud 435 on an arm 436 of a lever 437 pivotally supported on a stud 438. A link 439 connects an arm 440 of the lever 437 with an arm 441 journaled on the outer tube 136. The arm 441 is connected by a sleeve (not shown) to the segment gear 426.

The configuration of the cam groove 429 is such that at the proper time during the operation of the machine it rocks the arm 432 and consequently the arm 434 counter-clockwise and then clockwise to normal. This movement is transmitted by the stud 435 to the lever 437, rocking this lever first clockwise and then counter-clockwise to normal, which movement is transmitted by the link 439 to the arm 441 and segment 426, rocking the segment first clockwise and then counter-clockwise for the above described purpose of advancing the consecutive number type wheels one step.

*Printing platens*

Impressions are taken from the type wheels 365, 369, 413 and 414 (Fig. 30) by printing platens 442 and 443 (Fig. 28), respectively, mounted in arms 444 and 445. The arm 444 is pivotally supported on a stud 446 projecting from the right side frame 30 of the machine, and the arm 445 is pivotally supported on a stud 447 projecting from the side frame 30 of the machine. A spring 448 (Fig. 28) holds a stud 449 on the arm 444 in contact with the left side of a projection 450 on a lever 455. Likewise a stud 457 on the arm 445 is held in contact with a projection 458 on an arm 459 also pivoted on the stud 447, by a spring 460. A stud 461 on the arm 459 projects through a slot 462 in the arm 463 of the lever 455, thus coupling the arm 459 and lever 455 together. A strong spring 464 having one of its ends attached to the arm 463 of the lever 455 normally holds a block 465 secured to the side of the arm 459 against the periphery of a cam 466 secured to the drive shaft 80.

At the proper time during the rotation of the shaft 80 the cam 466 acting on the block 465 rocks the arm 459 clockwise and the arm 463 of the lever 455 counter-clockwise against the tension of the spring 464. At this movement of the arm 459 the spring 460 maintains the stud 457 in contact with the projection 458, thus rocking the platen arm 445 clockwise and retracting the platen 443. The spring 448 upon counter-clockwise movement of the lever 455 draws the platen arm 444 counter-clockwise, maintaining the stud 449 in contact with the projection 450. At the proper time a shoulder on the cam 466 passes the nose of the block 465 whereupon the spring 464 rocks the lever 455 suddenly clockwise and the arm 459 suddenly counter-clockwise to throw the arms 444 and 445 clockwise and counter-clockwise, respectively, to bring the platens 442 and 443 sharply into contact with their respective groups of type wheels to take the impressions therefrom. When the block 465 escapes the shoulder on the cam 466, it will be noted that the counter-clockwise movement of the arm 459 is limited by the lesser radius of the cam 466. However, the momentum of the platen arms 444 and 445 after the arm 459 and lever 455 have come to rest is sufficient to carry the platens into contact with the type wheels. After the impressions are thus made, the springs 448 and 460 restore their respective platen arms 444 and 445, bringing the studs 449 and 457 into contact with the projections 450 and 458 respectively.

Ink ribbon

In order to make impressions on the record material when the platens are brought into contact with the type wheels, an ink ribbon is usually provided in machines of this type. An ink ribbon is therefore provided in the present machine. This ink ribbon 467 (Fig. 28) is adapted to be wound and unwound from the spools 468 and 469 carried by a plate 471. The ink ribbon 467 is guided in the course of its travel about the groups of type wheels by a series of guides 470 carried by the plate 471. This plate 471 is supported by studs (not shown), but carried by the printer frame 367, which studs project into three of the guides 470.

Audit strip

The audit strip 472 is adapted to be unwound from the usual supply roll 473 and wound on a receiving roll 474, both of which rolls are suitably supported in the machine. The audit strip 472 passes between the ink ribbon 467 and the platen 442, being guided by a series of studs 475 projecting from the printer frame 367.

The receiving roll is adapted to be rotated either manually by a key 476 projecting through a cabinet (see Fig. 1), or by a pawl 477 pivotally carried on an arm 478 of the lever 455. The pawl 477 cooperates with a ratchet 479 secured to the inner end of the receiving roll.

Each time the lever 455 is rocked counter-clockwise under the influence of the cam 466, as above described, in order to effect the impression, the pawl 477 is drawn downwardly, advancing the ratchet and consequently the receiving roll counterclockwise, as viewed in Fig. 28, one space. The clockwise movement of the lever 455 retracts the pawl 477. Retrograde movement the receiving roll is prevented by a retaining pawl 480 pivotally supported on the frame 367 and cooperating with the ratchet 479.

Postage label issuing mechanism

The mechanism for issuing and printing the postage label, a facsimile of which appears in Fig. 27, is substantially the same as the ticket-issuing mechanism described in the Robertson Patent No. 1,929,652, issued October 10, 1933. This mechanism will now be described.

The postage labels are printed on a gummed web 485, unrolled from the supply roll 486 suitably supported in the machine. The web 485 is threaded upwardly through a chute 487, and between an electro cylinder 488 and a tension roller 489. After leaving the chute 487 the web 485 passes through a chute 490 suitably supported on knife arms 495, and between a stationary knife 491 and a movable knife blade 492. The web then enters a chute 493, passing between pairs of ejector rolls 484 and 494, thence out of the machine. The knife 492 is operated at the proper time to sever the printed portion of the web, which is then issued from the machine to form the postage label.

The knife blade 492 is carried on the arms 495 pivoted on the stud 433 (see Fig. 31), which arms 495 are secured to the arm 432, described above. At the proper time the cam 430 (Fig. 31) rocks the arm 432 and consequently the arms 495 counterclockwise, whereupon the knife blade 492, cooperating with the stationary knife blade 491, severs the web 485 to form the postage label. Shortly thereafter the ejecting rolls 484 and 494, by means not disclosed herein, but which is fully disclosed in the above mentioned Robertson Patent No. 1,929,652, operates to eject the separate labels from the machine.

In order to take the impression from the cylinder 488 the usual ink roller 496 (Fig. 26) carried by a pair of arms 497 suitably supported in the machine, is provided to contact the electro carried by the cylinder at each rotation of said cylinder to ink the electrotype.

After the postage labels have been severed from the web 485 and ejected into the top part of the chute 493 by the rollers 484 and 494, if the operator should leave several of those checks or labels collect in the upper part of the chute there would be great danger of them clogging the chute, thus preventing the issuance of further labels if no means were provided to prevent such clogging.

Therefore, in order to prevent such a condition, the present machine is provided with means whereby, if the operator fails to remove the label after it has been severed and ejected into a position where the operator can take a hold of it and remove it, the next label forces the one left remaining in the chute out of the chute.

A special but simple device attached to the chute has been provided to accomplish the above result, and will now be described with particular reference to Figs. 34 and 36.

The chute 493 proper is supported by a plate 540 having a flange 541 carrying a stud 542 adapted to be engaged by a latch 543 (Fig. 26) to hold the plate 540 and chute 493 in place in the machine. The plate 540 carries the pair of ejecting rolls 494. Both the plate 540 and chute 494 are cut away so that the rolls 494 may project into the path of the label as it is fed toward said rolls. The rear of chute 493 is open at the top except for a bar 544, which bar is provided with two holes 545. Arranged between the bar 544 and the back of the chute 493 is a tension plate 546 carrying two pins 547 projecting into the holes 545. Those holes 545 are larger in diameter than the diameter of the pins 547 to allow the tension plate 546 to freely adjust itself under the influence of torsion springs 548, one end of each spring pressing against the plate 546, and the other end of the spring pressing against the bar 544.

The tension plate 546 is provided with three fingers 549 which by means of the pressure caused by springs 548 normally rest against the inside of the back of the chute 493. The tension plate 546 also has two fingers 550 resting against the outer side of the lower front part of the chute 493.

Due to the fact that the tension plate 546 is made out of comparatively thin material, and since the fingers 550 rest on the outer side of the lower front part of the chute, these fingers 550 form a guide for the web as it enters the lower end of the chute, while the springs 548 maintain a sufficient tension on the plate 546 to hold the fingers 549 against the inside of the upper half of the chute. This tension being just sufficient to permit the ejecting rollers 494 and their companion rollers 484 to feed the severed label upwardly so that it projects out of the machine, as viewed in Fig. 1.

If the operator should now fail to remove the printed and ejected postage label before operating the machine, the top of the second label severed by the machine as it is being ejected contacts the bottom edge of the label that has been left in the upper part of the chute, and due to the fact that the springs 548 maintain a tension on the plate 546 and fingers 549, the label which was printed by the previous operation is pushed upwardly and is finally ejected completely from the machine by the label which is being issued during the instant operation.

The postage label issuing mechanism is thrown off during total taking operations by the same means described for throwing off the consecutive number actuating means.

*Slip chute*

A suitable aperture (Fig. 32) is provided, in which to insert the slip or government form, a facsimile of which appears in Fig. 38, in order to receive the impression from the type wheels 365. This aperture is normally closed and is opened only when the control lever 42 is shifted clockwise to its "read" position to condition the machine to take a subtotal.

Referring to Fig. 1, it will be noted that a door 498 is provided at the upper half of the right-hand end of the cabinet in order to gain access to the audit strip roll, to replenish this roll when it is exhausted. An aperture 499 (see also Fig. 32) is provided in this door to receive the slip. At the upper end of the aperture 499 the cabinet is formed into lips 500, which lips act as guides when a slip is inserted in the machine. A spring 501 holds the slip after it is inserted.

A cover 502 (Fig. 33) projecting horizontally from an arm 503 pivoted on a stud 504 projecting from the right side frame of the machine, normally closes the aperture formed by the lips 500 (Fig. 32). A cover 510 hinged to the end of the cover 502 normally closes the aperture 499 in the door 498.

When the control lever 42 is rocked clockwise to its "read" position, it will be recalled that the movement is transmitted to the arm 253 in order to set the type wheels to print the character indicating that a "read" operation was made. An arm 511 secured to the outermost sleeve 136 to which particular sleeve the arm 253 is also secured, has a cam slot 512 therein embracing a stud 513 projecting from an arm 514 of a lever 515 pivoted on a suitably supported stud 516. A stud 517 on the free end of the arm 518 of the lever 515 projects through a slot 519 in an arm 520 pivoted on a stud 521. A stud 522 on the free end of the arm 520 projects through a cam slot 523 in the curved arm 503 supporting the cover.

When the control lever 42 is rocked clockwise to its "read" position (Fig. 33), rocking the arm 253 in a clockwise direction, the cam slot 512 through the stud 513 rocks the lever 515 clockwise. This movement of the lever 515 through the stud 517 and slot 519 rocks the arm 520 counter-clockwise, whereupon the stud 522, through the cam slot 523, rocks the curved arm 503 counter-clockwise to remove the covers 502 and 510 from their respective apertures, thereby rendering the slip chute accessible.

Restoring movement of the lever 42 to its add position, reverses the movement of the parts just described, rocking the arm 503 clockwise to again close the aperture.

A statement of mailing accompanies reader's mail sent to the post office. This form (Fig. 38) is inserted in the machine at the beginning of the run and the total and serial number printed thereon. After all the postage for the packages has been recorded and the postage issued, the form is again inserted and the closing reading taken. The difference between the two amounts represents total postage on the lot. The difference in serial numbers represents the number of pieces in the lot.

It is desirable, therefore, to print the opening receipt directly below the closing receipt, so that direct subtraction may be easily accomplished. This is effected by providing a sliding stop bar 525 (Fig. 32). This bar is slidably mounted on a stud 526, projecting inwardly from the door 498 and by a stud 527 on the bar 525 projecting through a slot in the door 498. The stud 527 extends an appreciable distance beyond the door to form a convenient knob whereby the operator may slide the bar 525 to the desired position. When the bar 525 is in its left-hand position, as illustrated in Fig. 32, it limits the distance to which the slip (Fig. 38) may be lowered in the aperture 499, thus locating the position at which the opening reading is to be printed, near the bottom of the slip. By shifting the slide 525 toward the right, the end thereof is removed from the aperture 499, thus permitting insertion of the slip to the bottom of the aperture whereby a point just above the printing of the opening reading is brought opposite the type wheels 365 to receive the impression of the closing reading.

It was stated above how sealing the shoulder collar 360 (Fig. 1) on the barrel 359 of the lock 349 by the seal 361 prevents removal of the cabinet from the machine. Another lock 524 (Fig. 35) having its barrel 35 (Fig. 1) projecting through a hole in the door 36 is provided to lock this door against opening. This lock also prevents removal of the cabinet from the machine. The postal authorities retain the key to the lock 349 and the manufacturer of the machine retains the key to the lock 524. The postal authorities affix the seals 361 and 530 to both locks. A large door 528 is provided in the front of the cabinet to gain access to the motor for minor repairs, such as oiling, replacing of blown fuses, etc.

However, it sometimes occurs that it is necessary to remove the motor from the machine in order to make more extensive repairs thereon. In order to do so it is necessary not only to open the door 528, but in addition to open the door 36. It is obvious that the seal 530 on the lock 524 must be broken, the collar 529 removed, and the lock operated before this door may be opened. The lock 524 is secured to the door 36 and operates a bolt 531 (Fig. 35) which cooperates with a notched stud 532 projecting forwardly from the cross-bar 33. The door 36 extends downwardly far enough to prevent removal of the motor (not shown) until the lock 524 is operated and the door opened. Should the motor be removed from the machine, it would be a simple matter to move the clutch control disc 283 (Fig. 15) out of cooperative relation with the nose 282 on the clutch arm 270 making it possible to operate the machine without depressing the motor release bar 43. Also, since the machine with the motor removed may be operated without operating the releasing mechanism, it would be possible to shift the control lever 42 to position the stud 127 (Fig. 22) on the link 128 between the ear 131 on the arm 126, and the ear 239 on the arm 222, thus disabling the totalizer engaging mechanism. This movement of the total lever 42 is also sufficient to rock the shaft 177 (Fig. 22) clockwise far enough to disengage the pitman 164 (Fig. 16) from the stud 163, thereby disabling the upper totalizer engaging mechanism.

Under these conditions it is possible to operate the machine to issue any amount of postage without accumulating such amount on the totalizer.

This situation is obviated by locking the small door 36, whereby it is impossible to remove the motor from the machine.

Reference to Figs. 3 and 35 discloses that a shield 533 is secured to the cross-bar 33, to render inaccessible the issuing postage totalizer when the doors 36 or 528 are open.

When both of the seals 361 and 530 have been broken, and the collars 360 and 529 removed from their respective lock barrels 359 and 35, the cabinet may be removed from the machine. The back of the cabinet 534 (Fig. 35) is made in a separate piece and is attached in the following manner:

A clip 535 secured to the back plate 534 is adapted to be slid downwardly in a bracket 536, secured to the back frame 32 of the machine before the remainder of the cabinet is attached to the machine. At the upper end of the plate 534 is attached an angle bracket 537 projecting forwardly under the upper part of the main cabinet. When the plate 534 is assembled, as shown in Fig. 35, and the main cabinet is installed and locked on the machine it is impossible to remove the back cabinet plate 534.

A few of the advantages of the machine of the present invention are as follows:

1. It saves time in selecting and affixing stamps, because it issues one postage label for any required denomination, from one-half cent to $9.99½.
2. Prevents losses through postage stamps being accidentally destroyed, mislaid, and sometimes stolen.
3. Saves time in detaching stamps from sheets because stamps can be quickly taken from the machine.
4. Eliminates placing "over" postage on packages during rush periods, to save selecting stamps of required denominations.
5. Eliminates mistakes in placing wrong postage on packages by picking up the wrong stamp or figuring incorrectly the required denominations to make up the postage.
6. Produces a stamp or postage label that can be used only by a firm or individual operating under permit from the United States Post Office Department.
7. Provides a permanent record of each package mailed each day, which can be filed away for future reference or submitted to the postmaster when required.
8. Shows at any time the exact amount of postage used, and thus enables the firm to know how must postage is still available.
9. Provides a quick and accurate method of making reports to the post office as to the amount of postage and number of packages in each lot.
10. The machine is especially adapted to all kinds of heavy mail, whether first, second, third or fourth class matter.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described; the combination with a totalizer frame; a totalizer carried by said frame; a shaft supporting said totalizer frame; and actuators for the totalizer; of a segment gear on said shaft; a shaft carried by the totalizer frame; a gear on the last-mentioned shaft, said gear meshing with the segment gear; means to operate the segment gear to rotate the second-mentioned shaft; and a cam on the second-mentioned shaft cooperating with stationary means to rock the totalizer frame to engage the totalizer with the actuators.

2. In a machine of the class described, the combination of a totalizer; an actuator therefor; a pivotally mounted totalizer supporting means; a cam carried by the supporting means; a member pivoted concentrically with the totalizer supporting means and cooperating with means rigid with the cam to oscillate the latter; and stationary means cooperating with the cam to rock the totalizer supporting means upon oscillation of the cam to engage the totalizer with and disengage it from the actuator.

3. In a machine of the class described, the combination of a totalizer; an actuator therefor; a pivotally mounted totalizer supporting frame; an oscillating device carried by the totalizer frame adapted to be oscillated relatively to the frame and shifted as a unit with the frame to engage the totalizer with and disengage it from the actuator; and means mounted concentrically with the pivot of the frame and cooperating with the oscillating device to oscillate and shift the latter.

WILLIAM H. ROBERTSON.